(12) United States Patent
Louis et al.

(10) Patent No.: US 10,808,143 B2
(45) Date of Patent: Oct. 20, 2020

(54) POLYARYLETHER KETONE COMPOSITIONS AND METHOD OF COATING A METAL SURFACE

(71) Applicant: SOLVAY SPECIALTY POLYMERS USA, LLC, Alpharetta, GA (US)

(72) Inventors: Chantal Louis, Alpharetta, GA (US); Mohammad Jamal El-Hibri, Atlanta, GA (US); Ryan Hammonds, Atlanta, GA (US); Jiqiang Xia, Alpharetta, GA (US)

(73) Assignee: SOLVAY SPECIALTY POLYMERS USA, LLC, Alpharetta, GA (US)

( * ) Notice: Subject to any disclaimer, the term of this patent is extended or adjusted under 35 U.S.C. 154(b) by 108 days.

(21) Appl. No.: 16/082,846

(22) PCT Filed: Mar. 3, 2017

(86) PCT No.: PCT/EP2017/055064
§ 371 (c)(1),
(2) Date: Sep. 6, 2018

(87) PCT Pub. No.: WO2017/153290
PCT Pub. Date: Sep. 14, 2017

(65) Prior Publication Data
US 2019/0031908 A1 Jan. 31, 2019

Related U.S. Application Data

(60) Provisional application No. 62/407,911, filed on Oct. 13, 2016, provisional application No. 62/305,731, filed on Mar. 9, 2016.

(30) Foreign Application Priority Data

May 4, 2016 (EP) .................................. 16168380

(51) Int. Cl.
| | | |
|---|---|---|
| *C09D 171/12* | (2006.01) | |
| *C08G 65/40* | (2006.01) | |
| *C08L 71/00* | (2006.01) | |
| *C09D 171/00* | (2006.01) | |
| *C23C 26/00* | (2006.01) | |
| *H01B 3/36* | (2006.01) | |
| *H01B 13/06* | (2006.01) | |

(52) U.S. Cl.
CPC ....... *C09D 171/12* (2013.01); *C08G 65/4012* (2013.01); *C08G 65/4025* (2013.01); *C08L 71/00* (2013.01); *C09D 171/00* (2013.01); *C23C 26/00* (2013.01); *H01B 3/36* (2013.01); *C08G 2650/40* (2013.01); *H01B 13/06* (2013.01)

(58) Field of Classification Search
CPC ..... C08L 71/00; C08L 71/08; C08G 2650/40; C08G 65/4012; F16L 58/1027; Y10T 156/10; Y10T 428/24942; B32B 2037/243; B32B 2307/704; B32B 2311/18; B32B 2311/24; B32B 2311/30; B32B 2371/00; B32B 27/288; B32B 15/18; B32B 15/20; B32B 2731/00; C03C 25/50; C08K 5/07; C08J 2371/00; C09J 2471/00; H01B 3/427; C09D 171/08
USPC ........... 156/60; 428/212, 379; 427/331, 384, 427/407.1, 358; 523/454, 457, 458, 459; 29/17.6; 524/357; 528/125
See application file for complete search history.

(56) References Cited

U.S. PATENT DOCUMENTS

| | | | |
|---|---|---|---|
| 4,609,714 A | * | 9/1986 | Harris ................. C08L 65/00 525/471 |
| 8,536,265 B2 | | 9/2013 | Meakin et al. |
| 2012/0160829 A1 | | 6/2012 | Dufaure et al. |
| 2016/0115314 A1 | | 4/2016 | Brule et al. |

FOREIGN PATENT DOCUMENTS

| | | |
|---|---|---|
| EP | 0138128 A1 | 4/1985 |
| EP | 184458 A2 | 6/1986 |
| EP | 1459882 A1 | 9/2004 |
| EP | 1559542 A1 | 8/2005 |
| WO | 2009058362 A1 | 5/2009 |
| WO | 2013092492 A1 | 6/2013 |
| WO | 2015019047 A1 | 2/2015 |
| WO | 2015124903 A1 | 8/2015 |
| WO | 2015189567 A1 | 12/2015 |
| WO | 2015198063 A1 | 12/2015 |
| WO | 2016016643 A1 | 2/2016 |

OTHER PUBLICATIONS

Murphy J., in "Additives for Plastics Handbook", 2nd Edition, 2001, Chapter 5.2.3., p. 43-48—Elsevier Advanced Technology.
Xigao J. et al., "A sulphonated poly(aryl ether ketone)", British Polymer Journal, 1985, vol. 17, pp. 4-10.

* cited by examiner

*Primary Examiner* — Camie S Thompson
(74) *Attorney, Agent, or Firm* — Beatrice C. Ortego

(57) ABSTRACT

A polyaryl ether ether composition(C) and methods of uses thereof are herein disclosed. The composition comprises a polymer blend [blend (B)] consisting of: —a first polyaryl ether ketone (PAEK-1)and —a second polyaryl ether ketone (PAEK-2), wherein the (PAEK-1) is crystalline and exhibits a melting temperature $T_m$ of 330° C. or higher and the (PAEK-2) is either amorphous or crystalline and exhibits a melting temperature $T_m$ of 315° C. or lower and wherein the (PAEK-1) constitutes more than 0% wt of blend (B). Composition (C) can be used in particular for the manufacture of coated metal surfaces, in particular for the coating of wires or of (part of) electronic devices.

16 Claims, No Drawings

POLYARYLETHER KETONE COMPOSITIONS AND METHOD OF COATING A METAL SURFACE

CROSS-REFERENCE TO PREVIOUS APPLICATIONS

This application claims priority from U.S. provisional application 62/305731, filed on Mar. 9, 2016, European patent application 16168380.0, filed on May 4, 2016 and U.S. provisional application 62/407911, filed on Oct. 13, 2016; the entire content of these application is explicitly incorporated herein by this reference.

TECHNICAL FIELD

The present invention relates to polymer compositions and uses thereof, in particular to a method of coating a metal surface with said compositions. More particularly, the compositions are polyarylether ketone compositions endowed with high temperature performance, good chemical resistance and, at the same time, high adhesion to metal surfaces and high ductility and toughness.

BACKGROUND ART

Polyarylether ketones (PAEKs) are polymers comprising repeating units having formulas:

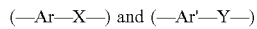

in which:

Ar and Ar', equal to or different from one another, are an optionally substituted aromatic divalent radical;

X is an electron-attracting group, typically selected from a carbonyl or a sulfonyl group and Y can be an oxygen atom, a sulphur atom or an alkylene group, and wherein at least 50% moles of the recurring units are —Ar—C(=O)—Ar'-units.

PAEKs, in particular polyarylether ether ketones (PEEKs), which comprise repeating units of formula:

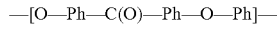

wherein each Ph, independently from one another, is an optionally substituted phenylene radical are highly crystalline and are used in a wide range of applications where there is a need for high temperature performance and good chemical resistance. However, PEEKs exhibit poor adhesion to metals, which makes their use in wire coating or other metal coating applications difficult. High flow PEEKs are desirable in three-dimensional printing and other applications requiring very low melt viscosities, but they tend to be brittle when their melt viscosities are very low.

There is therefore a need for improving the adhesion to metals, ductility and toughness of high flow PEEKs, while retaining their high temperature performance and chemical resistance.

EP 0184458 A (IMPERIAL CHEMICAL INDUSTRIES PLC) 11/06/1986 discloses a PAEK comprising the repeating units of formulas:

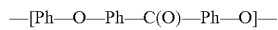

and

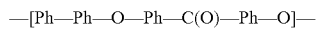

wherein Ph is a phenylene moiety and a process for the manufacture thereof. This document teaches that the polymer (herein after referred to as "PEEK-PEDEK") has good electrical insulating properties and is suitable as insulating material, for example as wire and cable coating, for use at high service temperatures. This document does not teach or suggest blends of PEEK-PEDEK with other polymers.

US 20120160829 A (ARKEMA FRANCE) Jun. 28, 2012 discloses a polymer composition containing at least one PAEK, optionally filled with fibres or other elements increasing the modulus, and with ferrimagnetic or ferromagnetic conductive particles. The composition can be used in the manufacture of articles that can be welded by induction in an alternating electromagnetic field. Even if it is stated that sometimes PAEK mixtures must be used in order to optimize the properties of the materials, the examples disclose only compositions containing a polyether ketone ketone (PEKK) and iron powders. This patent document does not teach to use the composition for the coating of metal surfaces.

U.S. Pat. No. 8,536,265 B (VICTREX MANUFACTURING COMPANY) Oct. 20, 2011 discloses a PAEK polymeric material, for example a PEEK, and composite materials comprising said material. The polymeric material has a melt viscosity (MV) in the range 0.05 to 0.12 kNsm$^{-2}$, preferably in the range 0.085 to 0.095 kNsm$^{-2}$. Even if it is stated that the composite material may comprise one or more of said PAEK polymeric materials, composite materials comprising only a single type of PAEK material, preferably PEEK, are preferred. The PAEK can be used in injection moulding or extrusion to manufacture components having relatively thin walls. There is no specific disclosure or suggestion of blended materials comprising more than one PAEK polymeric material, nor is there any hint to the use of the blends for metal coating applications, nor any teaching on how to improve ductility and toughness while retaining high temperature performance and chemical resistance.

WO 2013/092492 (SOLVAY SPECIALTY POLYMERS USA) Jun. 27, 2013 relates to mobile electronic devices comprising at least one structural part made of a polymer composition (C) comprising at least one polyarylether ketone (PAEK), at least one aromatic sulfone polymer (SP) such as polyphenyl sulfone (PPSU), polyether sulfone (PESU), polysulfone (PSU) or mixture thereof, and at least one reinforcing filler.

WO 2015/019047 A (VICTREX MANUFACTURING LIMITED) Feb. 12, 2015 discloses a component which comprises a first part and a second part, wherein said second part is in contact with said first part, wherein:

(i) the first part comprises a first semi-crystalline polymer and includes phenylene moieties, carbonyl moieties and ether moieties;

(ii) the second part comprises a second semi-crystalline polymer and includes phenylene moieties, carbonyl moieties and ether moieties.

The second polymer of the component has a melting temperature ($T_m$) that is less than the melting temperature ($T_m$) of the first polymer. According to a preferred embodiment, the first semi-crystalline polymer is a PEEK and the second polymer comprises is a PEEK-PEDEK. This patent document teaches that the first and second part can be secured together with a high-strength physico-chemical interaction to provide components which are highly chemically resistant and have long term mechanical properties. The component is manufactured by contacting a first part comprising the first polymers or a precursor of said first part with a second part comprising the second polymer. Typically, a molten first polymer, possibly including fillers, is overmoulded around the second part. This patent document does not disclose or suggest blends of different PAEKs and their use for metal coating applications.

WO 2015/124903 A (VICTREX MANUFACTURING LIMITED) Aug. 27, 2015 relates to a sintering process for manufacturing objects using electromagnetic radiations, said process comprising using a polymeric material which is a PEEK-PEDEK, optionally, in combination with fillers and radiation absorbers. The polymeric material can be a so called "virgin PEEK-PEDEK" or a mixture (blend) of a virgin and re-cycled PEEK-PEDEK. This patent document does not disclose mixtures of PEEK-PEDEK with other polymers.

WO 2015/189567 A (VICTREX MANUFACTURING LIMITED) Dec. 17, 2015 discloses a component (e.g. a part of an electronic device for connection to the worldwide web or for communication) comprising a first part and a second part in contact with the first one, wherein:

(i) the first part comprises a PEEK-PEDEK; and
(ii) the second part comprises a metal.

The polymer in the first part can be part of a composition comprising a polymer and a filler. There is no disclosure or suggestion of compositions comprising a PEEK-PEDEK in combination with other PAEKs, let alone with other PAEKs having higher crystallinity.

WO 2015/198063 A (VICTREX MANUFACTURING LIMITED) Dec. 30, 2015 relates to polymeric materials which define a component comprising a first part and a second part, wherein a third part is positioned between the first and second part. Each part comprises polymeric materials, namely PAEKs. In one embodiment, part A comprises a polymeric material (A), which is a PAEK, and another polymeric material (C) which is a PEEK-PEDEK. This patent document does not disclose or suggest using this composition of part A for metal coating applications.

WO 2016/016643 A (VICTREX MANUFACTURING LIMITED) Feb. 4, 2016 relates to a blend comprising:

polymeric material (A), namely a PEEK-PEDEK polymer and a polymeric material (B), which is preferably a PEEK.

This blend can be part of a composition comprising also a thermoplastic polymer (C), preferably a polysulfone and a fibrous filler. The blend or composition can be used for the manufacture of injection moulded components or extruded components.

No disclosure or hint is provided on the use of the blend for the coating of metals.

WO 2009/058362 A1 (POLYMICS, LTD) May 7, 2009 relates to protective films for substrates, including metals, said films being formed by a polymer base layer and a polymer top layer, wherein the top layer has a higher elongation at break and a higher crystallinity than the base layer. In particular, example IV of this document discloses a protective film formed by co-extrusion of an amorphous PEKK as base layer and a semi-crystalline PEEK as top layer. The film is applied to an aluminum sheet by pressing and heating at 335° C.; at this temperature (which is higher than the melting temperature of the amorphous PEKK and lower that the melting temperature of the semi-crystalline PEEK), the semi-crystalline PEEK does not melt, while the amorphous PEKK softens and bonds to the aluminum sheet. As a result, a blend, i.e. a uniform mixture, of the two polymers is not formed. It is indeed known in the art that in order to obtain polymer blends, bulk diffusion or convective processes are required, which do not occur when two polymers with different melting temperature are contacted and heated at a temperature higher than that of the lowest melting component but lower than that of the highest melting component. In view of the fact that the film disclosed in WO 2009/058362 A1 is not a uniform blend, its protective efficacy might be negatively affected if the top layer is damaged and the base layer is exposed.

EP 01 138 128 A1 (UNION CARBIDE CORPORATION) Apr. 24, 1985 relates to blends comprising at least two poly(aryl ether) polymers that are said to be useful, for example, for electrical wire and connector applications. The polymer blends therein disclosed have a single crystalline melting point ($T_m$) and a single glass transition temperature ($T_g$). This document does not provide any hint or suggestion to mixtures of at least two polymers wherein at least one is not crystalline; furthermore, this document neither teaches nor suggest that by mixing a crystalline and an amorphous polymer, a high crystallinity level and, therefore, high chemical resistance, would be retained.

US 2016/0115314 (ARKEMA FRANCE) Apr. 28, 2016 relates to a PEEK-based composition comprising a certain amount of PEKK, wherein the PEKK comprises a definite ratio of terephthalic and isophthalic units. It is stated (par. [0071]) that the incorporation of PEKK in a PEEK-based composition brings about an increase in two mechanical properties which are generally antagonistic, namely the yield point stress and the elongation at break. It is also stated (par. [0072]) that the crystallization kinetics are slowed down, thereby reducing the internal stresses of the material (which dispenses with lengthy and expensive post annealing stage) and allowing to obtain non deformed parts having the desired optimum geometry. However, this document is silent on the adhesion of the composition to metal substrates.

DISCLOSURE OF THE INVENTION

The Applicant has surprisingly found out that blends of at least two different PAEK polymers can be advantageously used for applications in which it is necessary to improve adhesion to metal, toughness and impact resistance, while retaining high strength, temperature performance and chemical resistance; in particular, the Applicant has found out that such mixtures can be used for metal coating applications.

Accordingly, in one aspect, the invention relates to a method [method (M)] of coating a metal surface, said method comprising applying to a metal surface a PAEK composition [composition (C)], said composition comprising a polymer blend [blend (B)] consisting of:

a first polyaryl ether ketone (PAEK-1) and
a second polyaryl ether ketone (PAEK-2),
wherein the (PAEK-1) is crystalline and exhibits a melting temperature Tm of 330° C. or higher and the (PAEK-2) is either amorphous or crystalline and exhibits a melting temperature Tm of 315° C. or lower and wherein the composition (C) comprises more than 50% wt of (PAEK-1).

In another aspect, the present invention relates to certain blends (B) and compositions (C) for carrying out method (M).

In a further aspect, the invention relates to finished articles [articles (A)] comprising compositions (C), in particular to a metal surfaces coated with composition (C) [surface (S)] and to articles [articles (A')] comprising said surface.

General Definitions

For the sake of clarity, throughout the present application:
the melting temperature $T_m$ of (PAEK-1) and (PAEK-2) is the temperature determined as the peak temperature of the melting endotherm on the $2^{nd}$ heat scan in differential scanning calorimeter (DSC) according to ASTM D3418-03, E1356-03, E793-06, E794-06 and using heating and cooling rates of 20° C./min. For the purpose of the present description, a polymer is crystalline if a melting endotherm is detected in the second heat scan;

any reference back to each generic definition and to each generic embodiment of the invention is intended to include each specific definition or embodiment falling within the respective generic definition or embodiment, unless indicated otherwise;

the use of parentheses "( )" before and after names of compounds, symbols or letters identifying formulae, e.g. "a blend (B)", "a composition (C)", formula (J-A), etc . . . , has the mere purpose of better distinguishing that name, symbol or letters from the rest of the text; thus, said parentheses could also be omitted;

when numerical ranges are indicated, range ends are included;

the term "halogen" includes fluorine, chlorine, bromine and iodine, unless indicated otherwise;

the term "method" is used as synonym of process and vice-versa;

the adjective "aromatic" denotes any mono- or polynuclear cyclic group (or moiety) having a number of π electrons equal to 4n+2, wherein n is 0 or any positive integer; an aromatic group (or moiety) can be an aryl or an arylene group (or moiety);

an "aryl group" is a hydrocarbon monovalent group consisting of one core composed of one benzenic ring or of a plurality of benzenic rings fused together by sharing two or more neighboring ring carbon atoms, and of one end. Non limitative examples of aryl groups are phenyl, naphthyl, anthryl, phenanthryl, tetracenyl, triphenylyl, pyrenyl, and perylenyl groups. The end of an aryl group is a free electron of a carbon atom contained in a (or the) benzenic ring of the aryl group, wherein an hydrogen atom linked to said carbon atom has been removed. The end of an aryl group is capable of forming a linkage with another chemical group;

an "arylene group" is a hydrocarbon divalent group consisting of one core composed of one benzenic ring or of a plurality of benzenic rings fused together by sharing two or more neighboring ring carbon atoms, and of two ends. Non limitative examples of arylene groups are phenylenes, naphthylenes, anthrylenes, phenanthrylenes, tetracenylenes, triphenylylenes, pyrenylenes, and perylenylenes. An end of an arylene group is a free electron of a carbon atom contained in a (or the) benzenic ring of the arylene group, wherein an hydrogen atom linked to said carbon atom has been removed. Each end of an arylene group is capable of forming a linkage with another chemical group.

The Polyaryl Ether Ketone (PAEK-1)

For the purpose of the present invention, the PAEK which constitutes (PAEK-1) is any polymer comprising recurring units (R1), wherein at least 50% moles of said recurring units comply with at least one of the formulae (J-A)-(J-Q) here below:

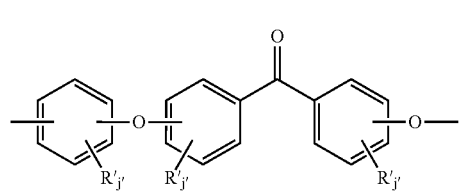
(J-A)

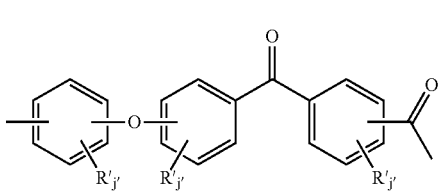
(J-B)

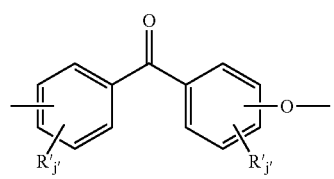
(J-C)

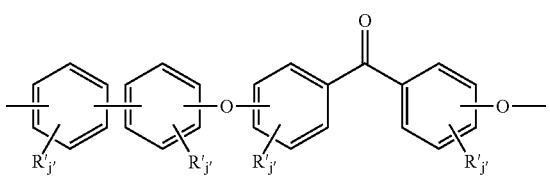
(J-D)

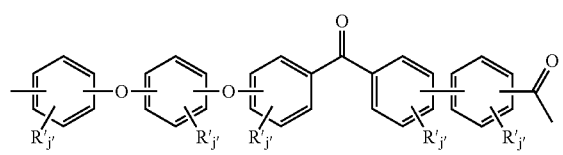
(J-E)

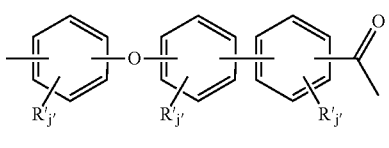
(J-F)

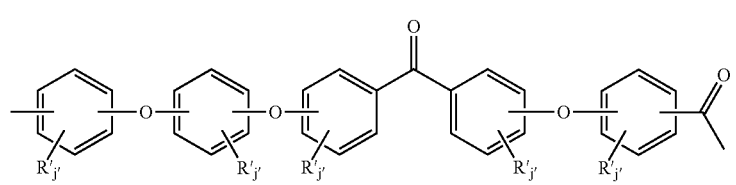
(J-G)

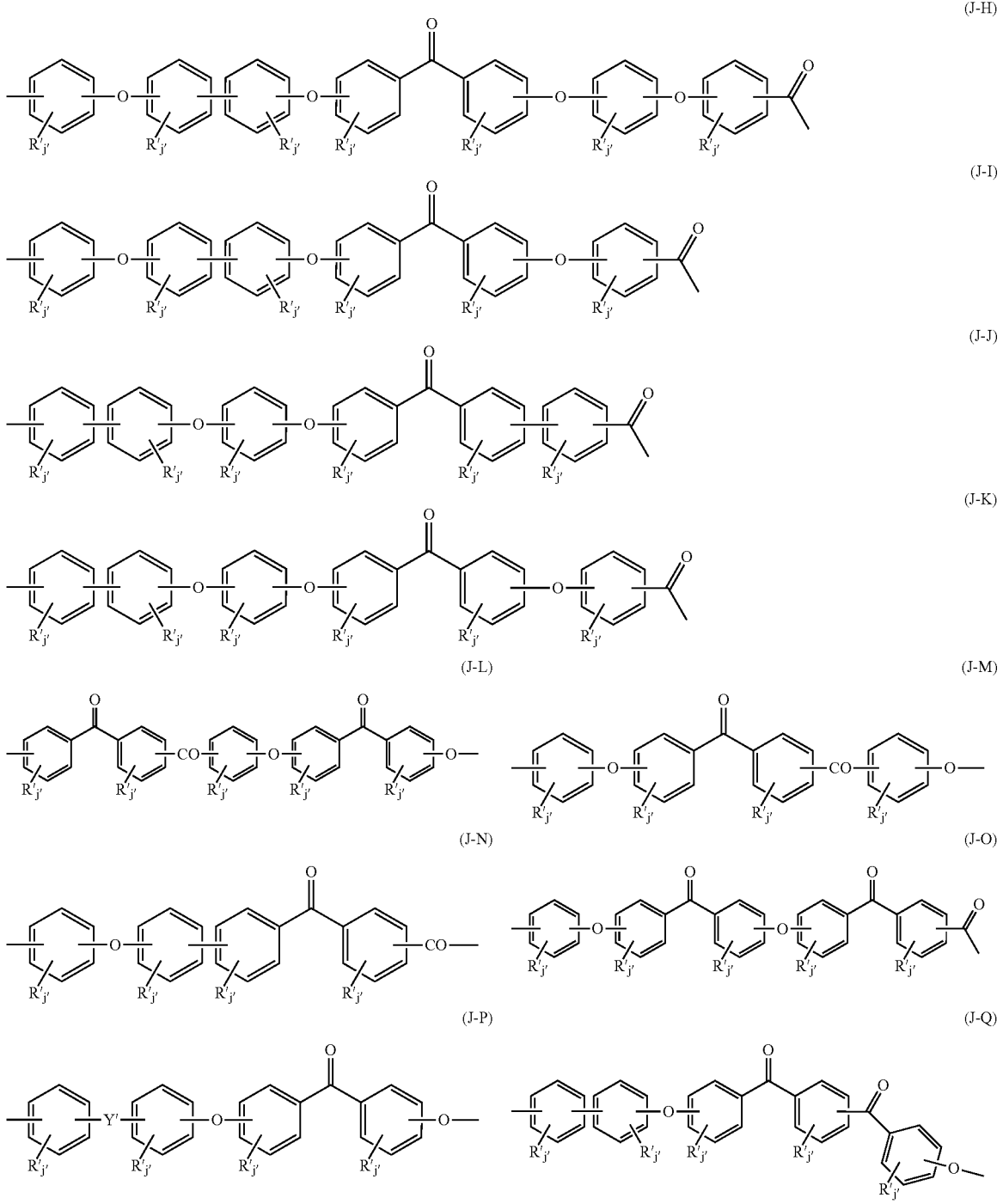

wherein:
each of R', equal to or different from each other, is selected from the group consisting of halogen, alkyl, alkenyl, alkynyl, aryl, ether, thioether, carboxylic acid, ester, amide, imide, alkali or alkaline earth metal sulfonate, alkyl sulfonate, alkali or alkaline earth metal phosphonate, alkyl phosphonate, amine and quaternary ammonium;
j' is zero or is an integer from 1 to 4 and
Y' is an alkylidene group said recurring units (R1) being selected in such a way as the polymer is crystalline and exhibits a melting temperature $T_m$ of 330° C. or higher In recurring unit (R1), the respective phenylene moieties may independently have 1,2-, 1,4- or 1,3-linkages to the other moieties different from R' in the recurring unit. Preferably, said phenylene moieties have 1,3- or 1,4- linkages, more preferably they have 1,4-linkages.

Still, in recurring units (R1), j' is preferably at each occurrence zero, that is to say that the phenylene moieties have no other substituents than those enabling linkages in the main chain of the polymer.
Preferred recurring units (R1) are thus selected from those of formulae (J'-A)-(J'-Q) here below:
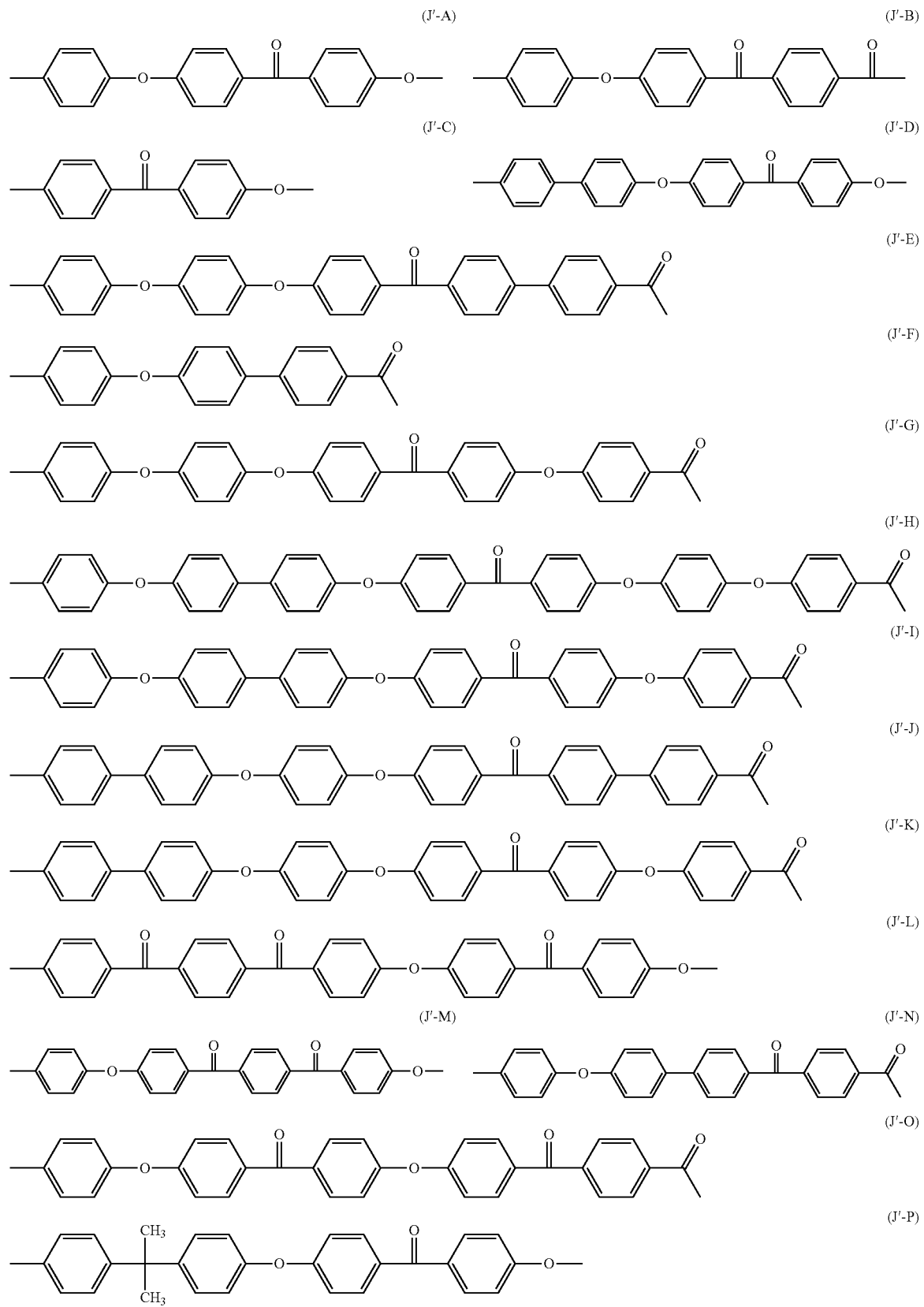

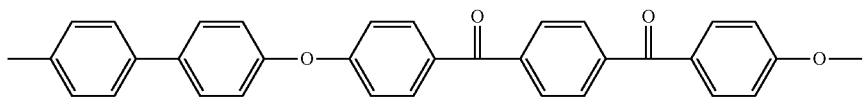
(J'-Q)

Advantageously, the (PAEK-1) comprises at least 50% moles of the recurring units (J-A), (J-B), (J-C) or (J-O). More advantageously, the (PAEK-1) comprises at least 60% moles, more advantageously at least 70% moles, still more advantageously at least 80% moles, and most advantageously at least 90% of the recurring units (J-A), (J-B), (J-C) or (J-O). Typically, units (J-A), (J-B), (J-C) and (J-O) are (S-A), (J'-B), (J'-C) and (J'-O) units.

Examples of commercially available suitable (PAEK-1) are KetaSpire® PEEK from Solvay Specialty Polymers, Vestakeep° PEEK from Evonik, Victrex® PEEK, PEEK-HT and PEEK-ST from Victrex®, Cypek® FC and Cypek® HT PEKK from Cytec.

In a preferred embodiment, the (PAEK-1) is a PEEK wherein at least 50% moles of the recurring units are recurring units (J-A). Preferably at least 60% moles, more preferably at least 70% moles, still more preferably at least 80% moles, most preferably at least 90% moles and most preferably at least 95% of the recurring units of (PAEK-1) are recurring units (J-A). More preferably, substantially all of the recurring units of the (PAEK-1) are recurring units (J-A).

In the present application, "substantially all of the recurring units" means at least 98% moles of the recurring units.

Preferred recurring units (J-A) are those complying with formula (J'-A). Excellent results were obtained when the PAEK-1 contained at least 98% moles units (S-A), namely with PEEKs available from Solvay Specialty Polymers USA with trademarks KetaSpire® KT-880 NL and KetaSpire® KT-890 NL.

Preferably, the (PAEK-1) exhibits a melt viscosity of at least 0.05 kN-s/m² measured according to ASTM D3835 at 400° C. and 1000 s-1 using a tungsten carbide die of 0.5×3.175 mm, more preferably of at least 0.07 kN-s/m², more preferably of at least 0.08 kN-s/m².

Preferably, the (PAEK-1) exhibits a melt viscosity of at most 0.65 kN-s/m² measured according to ASTM D3835 at 400° C. and 1000 s-1 using a tungsten carbide die of 0.5×3.175 mm, more preferably of at most 0.60 kN-s/m², more preferably of at most 0.50 kN-s/m².

Preferably, the (PAEK-1) exhibits an inherent viscosity measured according to ASTM D2857-95, at 0.1% in concentrated sulfuric acid at 25° C., of at least 0.4 dL/g, more preferably of at least 0.5 dL/g, most preferably of at least 0.6 dL/g.

Preferably, the (PAEK-1) exhibits an inherent viscosity measured at 0.1% in concentrated sulfuric acid at 25° C., of at most 2.0 dL/g, more preferably of at most 1.7 dLg/, most preferably of at most 1.5 dL/g.

The Polyaryl Ether Ketone (PAEK-2)

For the purpose of the present invention, the (PAEK-2) is any polymer comprising recurring units (R2), wherein at least 50% moles of said recurring units comply with at least one of formulae (J-A)-(J-Q) as defined above, selected in such a way as the PAEK-2 is amorphous or crystalline and exhibits a melting temperature $T_m$ of 315° C. or lower.

In recurring units (R2), the respective phenylene moieties may independently have 1,2-, 1,4- or 1,3 -linkages to the other moieties different from R' in the recurring unit. Preferably, said phenylene moieties have 1,3- or 1,4- linkages; more preferably they have 1,4-linkages, except units (J-A), (J-B) and (J-Q), which more preferably independently have 1,3 and 1,4-linkages.

Still, in recurring units (R2), j' is preferably at each occurrence zero, that is to say that the phenylene moieties have no other substituents than those enabling linkages in the main chain of the polymer.

Preferred recurring units (R2) are thus selected from those of formulae (J'-A) to (J'-Q) as defined above and also from units (J"-A), (J"-B) and (J"-Q) herein below:

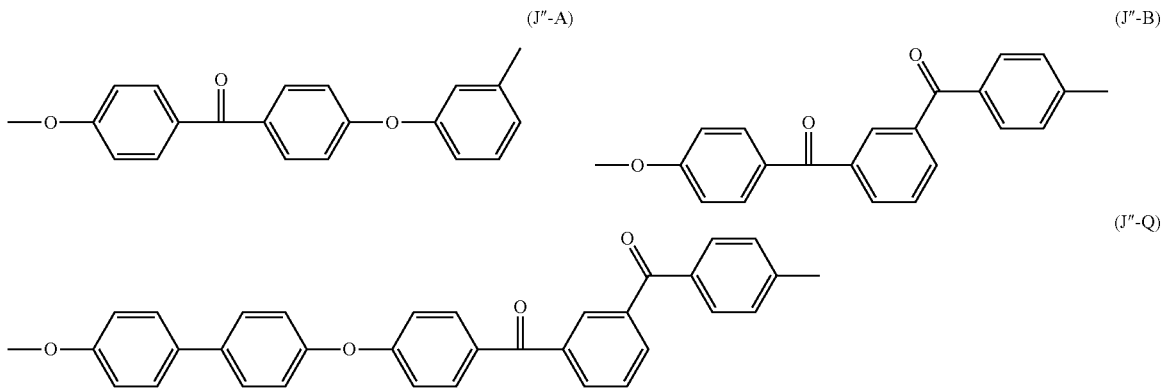

In a preferred embodiment of the invention, the (PAEK-2) is a polyarylether ketone ketone (PEKK), i.e. a polymer wherein at least 50% moles of the recurring units of PAEK-2 are a combination of units (J'-B) and (J"-B). Preferably at least 60% moles, more preferably at least 70% moles, still more preferably at least 80% moles and most preferably at least 90% moles of the recurring units of PEKK are recurring units (J'-B) and (J"-B). More preferably, at least 95% moles of the recurring units of the PEKK are recurring units (J'-B) and (J"-B). Very good results were obtained with Cypek® DS-E or DS-M PEKK available from Cytec.

In another preferred embodiment of the invention, the (PAEK-2) is a PEEK-PEDEK, i.e. a polymer wherein at least 50% moles of the recurring units of PAEK-2 are a combination of recurring units (J'-A) and (J'-D) as defined above. Preferably at least 60% moles, preferably at least 70% moles, still more preferably at least 80% moles and most preferably at least 90% moles of the recurring units of the PEEK-PEDEK are recurring units (J'-A) and (J'-D). More preferably, at least 95% moles of the recurring units of the PEEK-PEDEK are recurring units (J'-A) and (J'-D). Most preferably, all of the recurring units of the PEEK-PEDEK are recurring units (J'-A) and (J'-D). PEEK-PEDEK polymers can be manufactured according to the method disclosed in the aforementioned EP 0184458 A2 to Imperial Chemical Industries PLC. Preferably, the molar ratio of recurring units (J'-A)/(J'-D) is in the range 65/35 to 85/15. In exemplary embodiments, all recurring units were (J'-A) and (J'-D) units in the following (J'-A)/(J'-D) molar ratios: 65/35, 70/30, 75/25, 80/20 and 85/15.

In another preferred embodiment of the invention, the (PAEK-2) is a sulfonated PEEK, i.e. PEEK in which at least 50% moles of the recurring units are recurring units (J'''-A) here below:

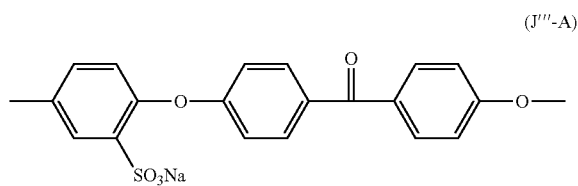

(J'''-A)

and substantially all the rest of the recurring units are recurring units of formula (J'-A) as defined above. Sulfonated PEEK can be manufactured by sulfonation reaction of a PEEK; in particular, a sulfonated PEEK in which at least 50% moles of the recurring units are recurring units (J'''-A) can be manufactured by sulfonation reaction of a PEEK wherein substantially all recurring units are recurring units (J'-A). For the avoidance of doubt, these preferred (PAEK-2) contain at least 98% moles of a combination of recurring units (J'-A) and (J'''-A), wherein recurring units (J'''-A) comprise at least 50% moles of the overall recurring units contained in the (PAEK-2).

In another preferred embodiment of the invention, at least 50% moles of the recurring units of the (PAEK-2) are recurring units (J'-P). Preferably at least 60% moles, preferably at least 70% moles, still more preferably at least 80% moles and most preferably at least 90% moles of the recurring units of the (PAEK-2) are recurring units (J'-P). More preferably, at least 95% moles of the recurring units of the PAEK-2 are recurring units (J'-P). Most preferably, all of the recurring units of the PAEK-2 are recurring units (J'-P). This PAEK-2 can be manufactured according to known methods by polycondensation reaction of bisphenol A with a 4,4'-dihalodibenzophenone, typically 4,4'-difluorodibenzophenone.

In still another preferred embodiment of the invention, at least 50% moles of the recurring units of the (PAEK-2) is a combination of recurring units (J'-A) and (J''-A). Preferably at least 60% moles, preferably at least 70% moles, still more preferably at least 80% moles and most preferably at least 90% moles of the recurring units of the (PAEK-2) are recurring units (J'-A) and (J''-A). More preferably, at least 95% moles of the recurring units of the (PAEK-2) are recurring units (J'-A) and (J''-A). Most preferably, all of the recurring units of the (PAEK-2) are recurring units (J'-A) and (J''-A).

In still another preferred embodiment of the invention, at least 50% moles of the recurring units of the (PAEK-2) are recurring units (J''-A). Preferably at least 60% moles, preferably at least 70% moles, still more preferably at least 80% moles and most preferably at least 90% moles of the recurring units of the (PAEK-2) are recurring units (J''-A). More preferably, at least 95% moles of the recurring units of the (PAEK-2) are recurring units (J''-A). Most preferably, all of the recurring units of the (PAEK-2) are recurring units (J''-A).

In still another preferred embodiment of the invention, at least 50% moles of the recurring units of the (PAEK-2) are recurring units (J''-Q). Preferably at least 60% moles, preferably at least 70% moles, still more preferably at least 80% moles and most preferably at least 90% moles of the recurring units of the (PAEK-2) are recurring units (J''-Q). More preferably, at least 95% moles of the recurring units of the (PAEK-2) are recurring units (J''-Q). Most preferably, all of the recurring units of the (PAEK-2) are recurring units (J''-Q).

Preferably, the (PAEK-2) exhibits a melt viscosity of at least 0.03 kN-s/m$^2$ measured according to ASTM D3835 at 400° C. and 1000 s$^{-1}$ using a tungsten carbide die of 0.5×3.175 mm, more preferably of at least 0.04 kN-s/m$^2$, more preferably of at least 0.05 kN-s/m$^2$.

Preferably, the (PAEK-2) exhibits a melt viscosity of at most 0.65 kN-s/m$^2$ measured according to ASTM D3835 at 400° C. and 1000 s$^{-1}$ using a tungsten carbide die of 0.5×3.175 mm, more preferably of at most 0.60 kN-s/m$^2$, more preferably of at most 0.50 kN-s/m$^2$.

Preferably, the (PAEK-2) exhibits an inherent viscosity measured according to ASTM D2857-95 at 0.1% in concentrated sulfuric acid at 25° C., of at least 0.2 dL/g, more preferably of at least 0.3 dLg/, most preferably of at least 0.4 dL/g.

Preferably, the (PAEK-2) exhibits an inherent viscosity measured at 0.1% in concentrated sulfuric acid at 25° C., of at most 2.0 dL/g, more preferably of at most 1.7 dLg/, most preferably of at most 1.5 dL/g.

Preferably the (PAEK-2) exhibits a 5% weight loss at a temperature ("$T_d$") of no less than about 300° C., no less than about 350° C., or no less than about 400° C., as measured by thermal gravimetric analysis ("TGA") according to the ASTM D3850 standard. TGA measurements are performed with starting temperature of 30° C., an ending temperature of 800° C., a ramp rate of 10° C./minute and under a nitrogen atmosphere using a flow rate of 60 mL/minute.

The Blend (B) of (PAEK-1) and (PAEK-2)

For the purpose of the present invention, the (PAEK-1) and the (PAEK-2) are blended together to provide a blend (B) according to methods known in the art. More than one (PAEK-1) and more than one (PAEK-2) can be used in blends (B); however, blends (B) preferably comprise only one (PAEK-1) in combination with one (PAEK-2). As used herein, the term "blend" is intended to mean a homogeneous (or uniform) physical mixture of the two polymers. A blend is obtainable by any method known in the art wherein convection is the dominant mixing motion, including melt-mixing (or melt compounding), solution blending and latex mixing.

Advantageously, blend (B) is manufactured by melt compounding, as explained in detail below with reference to composition (C).

Alternatively, blend (B) can be manufactured by powder blending as explained in detail below with reference to composition (C).

(PAEK-1) and (PAEK-2) are mixed in variable weight ratios, provided that the weight of (PAEK-1) is higher than the weight of (PAEK-2), i.e. (PAEK-1) comprises more than 50% wt of blend (B). Advantageously, the (PAEK-1) comprises at least 60% wt of blend (B), preferably at least 70% of blend (B), more preferably at least 75% wt of blend (B). In some cases, the (PAEK-1) comprises at least 90% wt of blend (B).

Advantageously, method (M) is carried out with blends (B-1), comprising:
a (PAEK-1) which is a PEEK wherein at least 98% moles of the recurring units are units of formula (J'-A) and
a (PAEK-2) wherein at least 50% moles of the recurring units are a combination of units of formula (J'-B) and (J"-B), a combination of units of formula (J'-A) and (J'-D), units of formula (J'"-A), units of formula (J'-P), or a combination of units of formulas (J'-A) and (J"-A).

Preferred examples of blends (B-1) are:
1) a blend (B-1a), comprising:
a (PAEK-1) which is a PEEK wherein at least 98% moles of the recurring units are units of formula (J'-A) and
a (PAEK-2) which is a PEKK wherein at least 95% moles of the recurring units are units of formula (J'-B) and (J"-B);
2) a blend (B-1b), comprising:
a (PAEK-1) which is a PEEK wherein at least 98% moles of the recurring units are units of formula (J'-A) and
a (PAEK-2) which is a PEEK-PEDEK wherein at least 95% moles of the recurring units are recurring units (J'-A) and (J'-D).
3) a blend (B-1c), comprising:
a (PAEK-1) which is a PEEK wherein at least 95% moles of the recurring units are units of formula (J'-A) and
a (PAEK-2) wherein at least 95% moles of the recurring units are recurring units (J'-P);
4) a blend (B-1d), comprising:
a (PAEK-1) which is a PEEK wherein at least 98% moles of the recurring units are units of formula (J'-A) and
a (PAEK-2) which is a sulfonated PEEK in which at least 50% moles of the recurring units are recurring units (J'"-A) and the rest of the recurring units are units (J'-A);
5) a blend (B-1e), comprising:
a (PAEK-1) which is a PEEK wherein at least 98% moles of the recurring units are units of formula (J'-A) and
a (PAEK-2) which is a PAEK in which at least 95% moles of the recurring units are recurring units (J'-A) and (J"-A).

Advantageously, the blend is a blend (B-1a) or (B-1b).

In a further embodiment, method (M) is advantageously carried out with a blend (B-2) comprising:
a (PAEK-1) as defined above, preferably a (PAEK-1) in which at least 50% moles of the recurring units comply with formula (J'-A),with a combination of units (J'-B) and (J"-B) or with formula (J'-C);
a (PAEK-2) as defined above wherein at least 50% recurring units comply with formula (J"-A) or (J"-Q).

Advantageously, method (M) is carried out with:
1) a blend (B-2a), comprising:
a (PAEK-1) which is a PEEK wherein at least 98% moles of the recurring units are units of formula (J'-A) and
a (PAEK-2) which is a PAEK in which at least 95% moles of the recurring units, preferably all recurring units, are recurring units (J"-A) [herein after also referred to as (PEmEK)];
2) a blend (B-2b), comprising:
a (PAEK-1) which is a PEEK wherein at least 98% moles of the recurring units are units of formula (J'-A) and
a (PAEK-2) which is a PAEK in which at least 95% moles of the recurring units, preferably all recurring units, are recurring units (J"-Q) [herein after also referred to as (PEDEKmK)].

More advantageously, method (M) is carried out with blend (B2-b).

Blends (B-1) in which the (PAEK-2) is not a PEEK-PEDEK represent a further aspect of the present invention. Advantageous examples of such blends are those comprising:
a (PAEK-1) which is a PEEK wherein at least 98% moles of the recurring units are units of formula (J'-A) and
a (PAEK-2) wherein at least 50% moles of the recurring units are a combination of units of formula (J'-B) and (J"-B), units of formula (J'"-A), units of formula (J'-P), or a combination of units of formulas (J'-A) and (J"-A). Preferred examples of such blends are blends (B1-a), (B1-c), (B1-d) and (B1-e) as defined above, blends (B1-a) being more preferred.

Blends (B-2) also represent a further aspect of the present invention; blends (B-2a) and (B2-b) being preferred, blend (B2-b) being more preferred.

The composition (C) exhibits a good chemical resistance and preferably exhibits an enthalpy of fusion measured on the $2^{nd}$ heat DSC scan of at least 19 J/g of polymer (that is excluding optional ingredients as detailed below), more preferably of at least 26 J/g polymer, more preferably of at least 32 J/g of polymer, more preferably of at least 39 J/g of polymer and most preferably of at least 43 J/g of polymer.

The composition (C) exhibits good chemical resistance demonstrated in Environmental Stress Cracking Resistance (ESCR) experiments carried out as described in detail in the Experimental Section below. Preferably the composition (C) exhibits a critical strain to failure of at least 0.5% after a 24 hour immersion exposure in either toluene or methyl ethyl ketone at room temperature. More preferably the composition (C) exhibits a critical strain to failure of at least 0.7% after this exposure, and most preferably of at least 0.9%.

Optional Ingredients in Composition (C)

A composition (C) for carrying out method (M) can be constituted only of a blend (B) as defined above or may comprise additional ingredients, in particular reinforcing fillers. In one embodiment, a composition (C) comprises, preferably consists of, a blend (B) as defined above and at least one reinforcing filler.

A large selection of reinforcing fillers may be included in composition (C). They are preferably selected from fibrous and particulate fillers. For the purpose of the present invention, a fibrous reinforcing filler is a material having length, width and thickness, wherein the average length is significantly larger than both the width and thickness. Generally, such a material has an aspect ratio, defined as the average ratio between the length and the largest of the width and thickness of at least 5. Preferably, the aspect ratio of the reinforcing fibers is at least 10, more preferably at least 20, still more preferably at least 50.

Preferably, the reinforcing filler is selected from mineral fillers (such as talc, mica, kaolin, calcium carbonate, calcium silicate, magnesium carbonate), glass fiber, carbon fibers, synthetic polymeric fiber, aramid fiber, aluminum fiber, titanium fiber, magnesium fiber, boron carbide fibers, rock wool fiber, steel fiber, wollastonite, etc. Still more preferably, it is selected from mica, kaolin, calcium silicate magnesium carbonate.

In a one embodiment, the filler is chosen from fibrous fillers.

Advantageously the reinforcing filler is chosen from glass fibers and carbon fibers. Excellent results were obtained when glass fibers were used. Glass fibers are silica-based glass compounds that contain several metal oxides which can be tailored to create different types of glass. The main oxide is silica in the form of silica sand; the other oxides such as calcium, sodium and aluminium are incorporated to reduce the melting temperature and impede crystallization. Glass fibers may have a round cross-section or a non-circular cross-section (so called "flat glass fibers"), including oval, elliptical or rectangular. The glass fibers may be added as endless fibers or as chopped glass fibers or as milled glass fibers, whereas chopped glass fibers are preferred. The glass fibers have generally an equivalent diameter of 5 to 20 preferably of 5 to 15 mm and more preferably of 5 to 10 mm. All glass fiber types, such as A, C, D, E, M, S, R, T glass fibers (as described in chapter 5.2.3, pages 43-48 of *Additives for Plastics Handbook,* 2nd ed, John Murphy), or any mixtures thereof or mixtures thereof may be used, however, E and S glass fibers are preferred.

In a further embodiment, the filler is a particulate filler. Examples of particulate fillers are zinc oxide, zinc sulphide, mica, silica, talc, alumina, kaolin, calcium sulfate, calcium carbonate, titanium oxide, clay, glass powder, nickel carbonate, iron oxide, quartz powder, magnesium carbonate, fluorocarbon resin, barium sulphate, graphite, carbon powder and nanotubes. The non-fibrous fillers may be introduced in the form of powder or in the form of flaky particles.

In another preferred embodiment, composition (C) comprises at least one fibrous reinforcing filler and at least one particulate reinforcing filler.

In the composition (C), the at least one reinforcing filler is present in an amount of advantageously at least 5 wt. %, preferably at least 10 wt. %, more preferably at least 15 wt. %, still more preferably at least 20 wt. %, even more preferably at least 25 wt. %, yet even more preferably at least 26 wt. %, and most preferably at least 28 wt. %, based on the total weight of the polymer composition (C).

The reinforcing filler is also present in an amount of advantageously at most 50 wt. %, preferably at most 45 wt. %, more preferably at most 40 wt. %, still more preferably at most 35 wt. %, even more preferably at most 34 wt. %, and most preferably at most 32 wt. %, based on the total weight of the polymer composition (C).

Preferably, the reinforcing filler is present in an amount ranging from 20 to 50 wt. %, more preferably from 25 to 45 wt. %, still more preferably from 26 to 40 wt. % and most preferably from 28 to 34 wt. %, based on the total weight of the polymer composition (C).

The composition (C) may further optionally comprise an additional polymer selected from polyaryl ether sulfones (PAES), polyphenylene sulfides (PPS) and polyetherimides (PEI) or a mixture thereof in an amount not higher that 50% wt with respect to the overall weight of (PAEK-1) and (PAEK-2).

The composition (C) may further optionally comprise additional additives such as ultraviolet light stabilizers, heat stabilizers, antioxidants, pigments, processing aids, lubricants, flame retardants, and/or conductivity additive such as carbon black and carbon nanofibrils.

In a preferred embodiment, the composition (C) does not comprise ferromagnetic or ferromagnetic conductive particles.

In a further preferred embodiment, the composition does not comprise more than 0.5 wt % of a low molecular weight aromatic compound; preferably, it does not comprise more than 0.5 wt % of an aromatic compound having a molecular weight up to 3,000 g/mol.

Advantageously, compositions (C) comprise, preferably consist of:
a blend (B-1) or (B-2), and
glass fibers.
More advantageously, compositions (C) comprise:
a blend (B-1a), (B-1b), (B-2a) or (B-2b) and glass fibers.

Manufacture of Composition (C) and Uses Thereof

Composition (C) can be manufactured by any known melt-mixing process that is suitable for preparing thermoplastic compositions. Such process is typically carried out by heating (PAEK-1) and (PAEK-2) at least at the melting temperature of PAEK-1 (which is the highest melting component of the blend) or above, thereby forming a blend (B) in the molten form, followed by extrusion and pelletization. The process can be carried out in a melt-mixing apparatus, for which any melt-mixing apparatus known to the one skilled in the art of preparing polymer compositions by melt mixing can be used. Suitable melt-mixing apparatus are, for example, kneaders, Banbury mixers, single-screw extruders, and twin-screw extruders. Preferably, use is made of an extruder fitted with means for dosing all the desired components to the extruder, either to the extruder's throat or to the melt. In the process for the preparation of the polymer composition (C) the constituting components for forming the composition are fed to the melt-mixing apparatus and melt-mixed in that apparatus. The constituting components may be fed simultaneously as a powder mixture or granule mixture, also known as dry-blend, or may be fed separately.

Advantageously, if composition (C) comprises one or more of the optional ingredients, such ingredients are added to the molten blend (B) and mixed; if more than one additional ingredient is used, such ingredients are preferably pre-mixed before addition to the molten melt (B).

Alternatively, the composition (C) can be manufactured by powder blending. Such process is typically carried out by mixing fine powders (at least 90% passing thru a 150 µm screen or finer) of (PAEK-1) and (PAEK-2) in the desired amounts. This process can be carried out in a solids or fine powder mixer. The mixer types usable for this purpose include tumble type mixers, ribbon type mixers, impeller type mixers, also known as high intensity mixers, shaker type mixers, as well as other types of solids and powders mixers known in the art.

Thus, composition (C) is obtained in the form of pellets or powder which are subsequently fabricated into a finished article [article (A)].

It will be clear to a person skilled in the art that composition (C) shall be heated to a temperature above the melting temperature of PAEK-1 before being fabricated into a finished article.

Preferably, composition (C) is used in a method (M) to manufacture coatings for metal surfaces.

However, thanks to the combination of toughness, ductility, chemical resistance and high temperature performance, the composition (C) can also be used in a 3D printing (also known as additive manufacturing) fabrication technique such as fused filament fabrication (FFF) or selective laser sintering (SLS). Commercially available 3D printing fabrication equipments of the FFF type include, as an example, the equipment manufactured by Stratasys, Inc. and sold under the Fortus® trademark. Examples of SLS based 3D printing equipment are available from EOS corporation such as the ones sold under the EOSINT® trademark. The composition (C) can also be used in making a stock shape that can be used for subsequent machining into a finished part. The stock shape can be in the form of a rod, a slab, a sheet, a tube, a billet, or in any other three dimensional shape that lends itself to further machining into a finished article. The stock shape can be produced by extrusion, injection molding or compression molding, as well as by other polymer melt fabrication techniques known in the art.

Metal surface coated with composition (C) and articles (A) comprising said surface The coated metal surface (S) according to the present invention is manufactured by a method (M) which comprises applying a composition (C) to a metal surface. The metal surface can have any shape, i.e. can be either a 2-dimensional (or planar) surface or a 3-dimensional surface. Part or all of the metal surface can be covered with composition (C).

Conveniently, the metal surface contains aluminium and/or copper or steel.

The metal surface can be, for example the surface of a wire, such as an electrical wire or cable, or the surface of a structural part of an electronic device, in particular an electronic device for mobile communication. Non limiting examples of devices for mobile communication are laptops, mobile phones, GPSs, tablets, personal digital assistants, portable recording devices, portable reproducing devices and portable radio receivers.

Typically, composition (C) is overmoulded over the metal surface. Conveniently, pellets of composition (C) are melted above their melting temperature to form a molten composition (C), which is contacted with the surface of the metal article. The contact is preferably carried out in a mould for injection moulding.

Alternatively, the composition (C) is applied to the metal surface by powder coating or slurry coating.

Before contacting composition (C) with the metal surface, the surface can be suitably treated in order to remove contaminants and/or grease and/or to chemically modify the surface and/or to alter the surface profile. Examples of treatment are abrasion of the surface to roughen it, addition of adhesion promotion agents, chemical etching, functionalization of the surface by exposure to plasma and/or radiation (for instance laser or UV radiation) or any combination of these. Preferably the metal surface is a chemically nano-etched metal surface as described in EP 1459882 A (Taisei Plas Co., Ltd.) Jul. 8, 2003 and EP1559542 A (Taisei Plas Co., Ltd.) Mar. 8, 2005 (so-called nano-molding technology or NMT-treated).

A structural part of an electronic device, as obtained from the method above, is generally assembled with other components in order to manufacture an electronic device, in particular a mobile electronic device.

Articles (A') comprising a surface at least part of which is coated according to method (M) of the present invention are a further object of the present invention. In particular, articles (A') are selected from a wire, such as an electrical wire or cable, or a structural part of an electronic device, in particular an electronic device for mobile communication. Non limiting examples of devices for mobile communication are laptops, mobile phones, GPSs, tablets, personal digital assistants, portable recording devices, portable reproducing devices and portable radio receivers.

The metal surface-composition assembly preferably exhibits a lap shear strength of at least 10 MPa or 1450 psi as measured by ASTM D1002.

The invention will be herein after described in greater detail in the following experimental section.

Should the disclosure of any patents, patent applications, and publications which are incorporated herein by reference conflict with the description of the present application to the extent that it may render a term unclear, the present description shall take precedence.

Experimental Section

Raw Materials

KETASPIRE® KT-880 NL [MV (400° C., 1000 s$^{-1}$) is 0.15 kPa.s, $T_m$=344° C.], KETASPIRE® KT-880P [MV (400° C., 1000 s-1) is 0.15 kPa.s, $T_m$=344° C.], KETASPIRE® KT-890 NL [MV (400° C., 1000 s$^{-1}$) is 0.09 kPa.s, $T_m$=345° C.] and KETASPIRE® KT-820FP [MV (400° C., 1000 s-1) is 0.40 kPa.s, $T_m$=340° C.] are aromatic polyetheretherketone (PEEK) polymers available from Solvay Specialty Polymers USA, LLC. Cypek® DS-E and DS-M PEKK are amorphous polyether ketone ketones (PEKK) available from Cytec. Cypek® DS-E and DS-M PEKK comprise recurring units (J'-B) and (J''-B) in 55/45-65/35 molar ratio. The "Td 5% Loss" of the DS-E polymer is 542° C.

Cypek® FC PEKK is a crystalline polyether ketone ketone (PEKK) available from Cytec. Cypek® FC PEKK comprises recurring units (J'-B) and (J''-B) in 66/34 -75/25 molar ratio.

4,4'-Biphenol, polymer grade, was procured from SI, USA.

1,3-Bis(4'fluorobenzoyl)benzene, 99% was procured from 3B Scientific Corp., IL, USA and purified by recrystallization in monochlorobenzene before use to reach a final purity at 99+% by HPLC.

Resorcinol, technical grade, was procured from Indspec, USA.

4,4'-Difluorobenzophenone, polymer grade, was procured from Jintan, China.

Diphenyl sulfone (polymer grade) was procured from Proviron (99.8% pure).

Sodium carbonate, light soda ash, was procured from Solvay S.A., France.

Potassium carbonate with a d90<45 µm was procured from Armand products.

Lithium chloride (anhydrous grade) was procured from Acros.

Fiberglass: Chopped E type glass fiber OCV910A was procured from Owens Corning.

Determination of the Melting Temperature

The melting temperature $T_m$ was determined as the peak temperature of the melting endotherm on the $2^{nd}$ heat scan in differential scanning calorimeter (DSC) according to ASTM D3418-03, E1356-03, E793-06, E794-06. Details of the procedure as used in this invention are as follows: a TA Instruments DSC Q20 was used with nitrogen as carrier gas (99.998% purity, 50 mL/min). Temperature and heat flow calibrations were done using indium. Sample size was 5 to 7 mg. The weight was recorded ±0.01 mg. The heat cycles were:

1st heat cycle: 30.00° C. to 400.00° C. at 20.00° C./min, isothermal at 400.00° C. for 1 min;
    1st cool cycle: 400.00° C. to 30.00° C. at 20.00° C./min, isothermal for 1 min;
    2nd heat cycle: 30.00° C. to 400.00° C. at 20.00° C./min, isothermal at 400.00° C. for 1 min.

The melting temperature $T_m$ was determined as the peak temperature of the melting endotherm on the 2nd heat scan. The enthalpy of fusion was determined on the 2nd heat scan. The melting of the composition was taken as the area over a linear baseline drawn from 220° C. to a temperature above the last endotherm (typically 370-380° C.).

Determination of the Enthalpy of Fusion

The enthalpy of fusion is determined as the area under the melting endotherm on the 2nd heat scan in differential scanning calorimeter (DSC) according to ASTM D3418-03, E1356-03, E793-06, E794-06 and using heating and cooling rates of 20° C./min. The enthalpy of fusion is determined on the 2nd heat scan and is taken as the area over a linear baseline drawn from above the Tg to a temperature above end of the endotherm.

For filled compositions, the enthalpy of fusion measured is corrected for filler content to express the enthalpy of fusion relatively to the polymer content only, excluding the filler.

Environmental Stress Cracking Resistance (ESCR)

Environmental Stress Cracking Resistance was evaluated by immersion of flex bars mounted on a parabola shaped fixture which provides a continually variable curvature radius and applied strain from 0 to 2.0%. The testing was performed in organic solvents like toluene and methyl ethyl ketone. Failure is defined as the occurrence of any cracking or crazing at or beneath the surface of the exposed bars, no matter how minor. Failure is also considered to have occurred if the material exhibits any signs of swelling, softening or solvation by the solvent at any strain level. The test wass performed on ASTM flexural bars 5 in long by 0.5 in wide by 0.125 in in thickness annealed at 200° C. for 2 h.

SYNTHESIS EXAMPLES

Example 1

Synthesis of Poly(Ether Bisphenol A Ketone) [Repeat Unit (J'-P)]

In a 1L 4-neck reaction flask fitted with a stirrer, a $N_2$ inlet tube, a Claisen adapter with a thermocouple plunging in the reaction medium, and a Dean-Stark trap with a condenser and a dry ice trap were introduced 169.70 g of N,N-dimethylacetamide, 254.5 g of toluene, 111.93 g of bisphenol A (0.490 mol), 84.70 g of dry potassium carbonate (0.613 mol). The flask content was evacuated under vacuum and then filled with high purity nitrogen (containing less than 10 ppm $O_2$). The operation was repeated twice. The reaction mixture was then placed under a constant nitrogen purge (60 mL/min).

The reaction mixture was heated slowly to 130° C. An azeotrope toluene/water was collected and the water separated. The reaction mixture was held for 4 hours at 130° C. while removing water through the azeotrope. At 130° C., a solution of 107.63 g of 4,4'-difluorodibenzophenone (0.493 mol) in 169.70 g of N,N-dimethylacetamide was added via an addition funnel to the reaction mixture over 30 minutes. At the end of the addition, the reaction mixture was heated to 165° C. After 40 minutes at 165° C., 4.279 g of 4,4'-difluorodibenzophenone were added to the reaction mixture while keeping a nitrogen purge on the reactor. After 15 minutes, 20.78 g of lithium chloride were added to the reaction mixture. 10 minutes later, another 3.2095 g of 4,4'-difluorodibenzophenone were added to the reactor and the reaction mixture was kept at temperature for 30 minutes. The reactor content was then coagulated in 2.0 L methanol.

The solid was filtered off and washed with a mixture acetone/methanol (50/50) then with water at pH between 1 and 12. The last wash water had a pH between 6 and 7. The powder was then dried at 120° C. under vacuum for 12 hours yielding 171.3 g of a white powder. Analysis by SEC showed the polymer had Mn=34046, Mw=123149. By DSC, the polymer was shown to be amorphous with a Tg (half height) of 157° C. The glass transition temperature Tg and the melting temperature $T_m$ were determined according to ASTM D3418, and as per the specific details described above, from the 2nd heat scan in a differential scanning calorimeter using a heating rate of 20° C./minute from 30 to 400° C.

Size exclusion chromatography (SEC) was performed using methylene chloride as a mobile phase. Two, 5 micron ("μm") mixed D SEC columns with guard columns (Agilent Technologies) was used for separation. An ultraviolet detector of 254 nm was used to obtain the chromatograms. A flow rate of 1.5 mL/min and injection volume of 20 micro liters ("μL") of a 0.2% weight by volume ("w/v") solution in mobile phase was selected. Calibration was performed using narrow calibration standards of Polystyrene (Agilent Technologies) (Calibration Curve: 1) Type: Relative, Narrow calibration standard calibration 2) Fit : 3rd order regression). Empower Pro GPC software (Waters) was used to acquire data, calibrate and determine molecular weight.

The "Td 5% Loss" of the polymer was 498° C. The "Td 5% Loss" refers to the average temperature at which the material lost 5% of its weight as determined by thermogravimetric analysis ("TGA") according to the ASTM D3850 standard. TGA was performed on a TA Instruments TGA Q500 from 30° C. to 800° C. under nitrogen (60 mL/min) at 10° C./minute.

Example 2

Synthesis of Sulfonated PEEK [Repeat Units (J'-A) and (J'''-A)]

This Example demonstrates the synthesis of the H+ and Na+ forms for sulfonated PEEK.

To demonstrate the synthesis of the H+ form of sulfonated PEEK, in a 3L 4-neck reaction flask fitted with a stirrer, a $n_2$ inlet tube, a Claisen adapter with a thermocouple plunging in the reaction medium, and a Dean-Stark trap with a condenser and a dry ice trap were introduced 2.0 L of concentrated $H_2SO_4$ (96%) and 300.00 g of KT820FP powder (commercially available form Solvay Specialty Polymers USA, LLC). At the end of the addition, the reaction mixture was heated to 50° C. under agitation and under a nitrogen atmosphere. The mixture was held at 50° c for 6 h then coagulated under high shear (Waring blender) in 24L demineralized water. The solid was filtered off and washed with water and aq. $Na_2CO_3$ solution until pH higher than 7. The solid was then dried at 100° C. under vacuum for 12 hours yielding 578 g of a soft hygroscopic beige solid. The analysis by FTIR was shown to be identical with sulfonated PEEK, as described in Xigao et al., *Brit. Polymer Journal*, 1985, V17, P 4-10, which is incorporated herein by reference.

By DSC, the polymer was shown to be amorphous with a Tg (half height) of 108° C. The "Td 5% Loss" of the polymer was 452° C. Elemental analysis for sulfur showed that the polymer was 51% sulfonated. The synthesized copolymer was represented by the following formula:

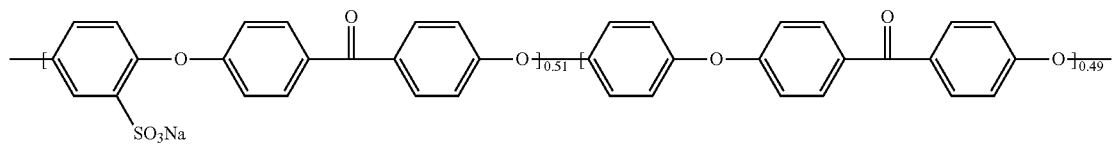

Example 3

Preparation of PEEK-PEDEK Copolymer 70/30 [Repeat Units (J'-A) and (J'-D)]

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 129.80 g of diphenyl sulfone, 18.942 g of hydroquinone, 13.686 g of 4,4'-biphenol and 54.368 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 26.876 g of $Na_2CO_3$ and 0.1524 g of $K_2CO_3$ was added via a powder dispenser to the reaction mixture over 30 minutes. At the end of the addition, the reaction mixture was heated to 320° C. at 1° C./minute. After 10 minutes at 320° C., 6.415 g of 4,4'-difluorobenzophenone were added to the reaction mixture while keeping a nitrogen purge on the reactor. After 5 minutes, 0.418 g of lithium chloride were added to the reaction mixture. 10 minutes later, another 2.138 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 73 g of a white powder. The repeat unit of the polymer is:

The melt viscosity measured by capillary rheolology at 400° C., 1000 s−1 using a tungsten carbide die of 0.5×3.175 mm was 0.19 kN-s/m². The "Td 5% Loss" of the polymer was 561° C.

Example 4

Preparation of PEEK-PEDEK Copolymer 75/25 [Repeat Units (J'-A) and (J'-D)]

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 128.21 g of diphenyl sulfone, 20.295 g of hydroquinone, 11.405 g of 4,4'-biphenol and 54.368 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 26.876 g of $Na_2CO_3$ and 0.169 g of $K_2CO_3$ was added via a powder dispenser to the reaction mixture over 30 minutes. At the end of the addition, the reaction mixture was heated to 320° C. at 1° C./minute. After 10 minutes at 320° C., 6.415 g of 4,4'-difluorobenzophenone were added to the reaction mixture while keeping a nitrogen purge on the reactor. After 5 minutes, 0.418 g of lithium chloride were added to the reaction mixture. 10 minutes later, another 2.138 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 74 g of a white powder.

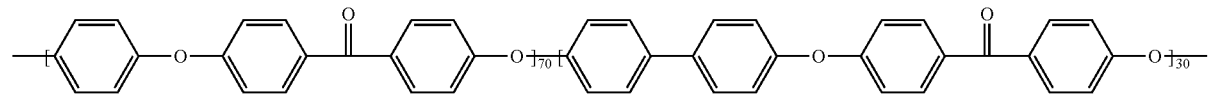

The repeat unit of the polymer is:

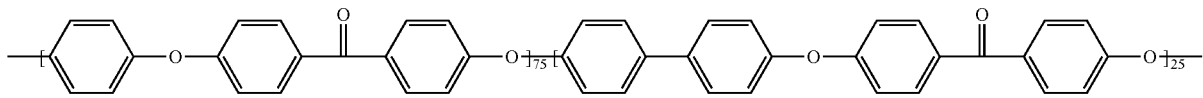

The melt viscosity measured by capillary rheology at 400° C., 1000 s−1 using a tungsten carbide die of 0.5×3.175 mm was 0.15 kN-s/m². The "Td 5% Loss" of the polymer was 557° C.

Example 5

Preparation of PEEK-PEDEK Copolymer 80/20 [Repeat Units (J'-A) and (J'-D)]

In a 500 mL 4-neck reaction flask fitted with a stirrer, a $N_2$ inlet tube, a Claisen adapter with a thermocouple plunging in the reaction medium, and a Dean-Stark trap with a condenser and a dry ice trap were introduced 127.7 g of diphenyl sulfone, 21.861 g of hydroquinone, 9.207 g of 4,4'-biphenol and 54.835 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 27.339 g of $Na_2CO_3$ and 0.171 g of $K_2CO_3$ was added via a powder dispenser to the reaction mixture over 30 minutes. At the end of the addition, the reaction mixture was heated to 320° C. at 1° C./minute. After 4 minutes at 320° C., 6.577 g of 4,4'-difluorobenzophenone were added to the reaction mixture while keeping a nitrogen purge on the reactor. After 5 minutes, 1.285 g of lithium chloride were added to the reaction mixture. 10 minutes later, another 2.192 g of 4,4'-difluorobenzophenone were added to the reactor and the reaction mixture was kept at temperature for 15 minutes.

The reactor content was then poured from the reactor into a SS pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 72 g of a white powder.

The repeat unit of the polymer is:

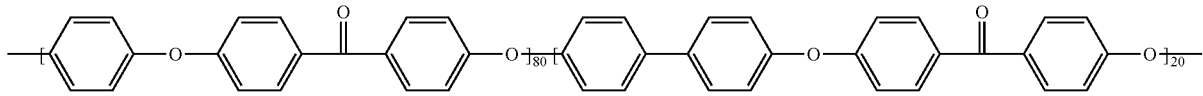

The melt viscosity measured by capillary rheology at 400° C., 1000 s−1 using a tungsten carbide die of 0.5×3.175 mm was 0.20 kN-s/m². The "Td 5% Loss" of the polymer was 561° C.

Example 6

Preparation of a PEmEK Polymer [Repeat Units (J"-A)]

In a 500 mL 4-neck reaction flask fitted with a stirrer, a $n_2$ inlet tube, a Claisen adapter with a thermocouple plunging in the reaction medium, and a Dean-Stark trap with a condenser and a dry ice trap, were introduced 128.63 g of diphenyl sulfone, 28.853 g of resorcinol and 58.655 g of 4,4'-difluorobenzophenone. The flask content was evacuated under vacuum and then filled with high purity nitrogen (containing less than 10 ppm $O_2$). The reaction mixture was then placed under a constant nitrogen purge (60 mL/min).

The reaction mixture was heated slowly to 150° C. At 150° C., a mixture of 28.742 g of $Na_2CO_3$ and 0.182 g of $K_2CO_3$ was added via a powder dispenser to the reaction mixture over 30 minutes. At the end of the addition, the reaction mixture was heated to 275° C. at 1° C./minute. After 1 minute at 275° C., 6.860 g of 4,4'-difluorobenzophenone were added to the reaction mixture while keeping a nitrogen purge on the reactor. After 5 minutes, 0.447 g of lithium chloride were added to the reaction mixture. 10 minutes later, another 2.287 g of 4,4'-difluorobenzophenone were added to the reactor and the reaction mixture was kept at temperature for 15 minutes.

The reactor content was then poured from the reactor into a stainless steeel pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 67 g of a light brown powder. The repeat unit of the polymer is 100% (J"-A):

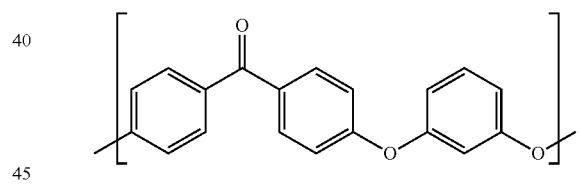

The melt viscosity measured by capillary rheology at 410° C., 46 s−1 according to ASTM 3835 was 0.33 kN-s/m2.

By DSC, the polymer was found to be amorphous with a Tg of 122° C.

Example 7

Preparation of a PEDEKmK Polymer [Repeat Units (J"-Q)]

In a 500 mL 4-neck reaction flask fitted with a stirrer, a $n_2$ inlet tube, a Claisen adapter with a thermocouple plunging in the reaction medium, and a Dean-Stark trap with a condenser and a dry-ice trap, were introduced 128.44 g of diphenyl sulfone, 29.980 g of 4,4'-biphenol and 53.188 g of 1,3-bis(4'-fluorobenzoyl)benzene. The flask content was evacuated under vacuum and then filled with high purity nitrogen (containing less than 10 ppm O2). The reaction mixture was then placed under a constant nitrogen purge (60 mL/min).

The reaction mixture was heated slowly to 150° C. At 150° C., a mixture of 17.662 g of Na$_2$CO$_3$ and 0.111 g of K$_2$CO$_3$ was added via a powder dispenser to the reaction mixture over 30 minutes. At the end of the addition, the reaction mixture was heated to 320° C. at 1° C./minute. After 1 minute at 275° C., 2.076 g of 1,3-bis(4'-fluorobenzoyl) benzene were added to the reaction mixture while keeping a nitrogen purge on the reactor. After 5 minutes, 0.550 g of lithium chloride were added to the reaction mixture. 10 minutes later, another 1.038 g of 1,3-bis(4'-fluorobenzoyl) benzene were added to the reactor and the reaction mixture was kept at temperature for 15 minutes.

The reactor content was then poured from the reactor into a stainless steel pan and cooled. The solid was broken up and ground in an attrition mill through a 2 mm screen. Diphenyl sulfone and salts were extracted from the mixture with acetone and water at pH between 1 and 12. The powder was then removed from the reactor and dried at 120° C. under vacuum for 12 hours yielding 69 g of a white powder. The repeat unit of the polymer is 100% (J"-Q):

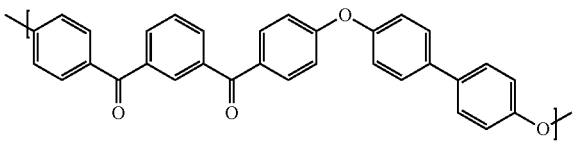

The melt viscosity measured by capillary rheology at 410° C., 46 s$^{-1}$ according to ASTM 3835 was 0.23 kN-s/m2.

By DSC, was polymer was found to exhibit a T$_m$ of 306° C.

Preparation of Polymer Blends and Tests
General Description of the Compounding Process for the Manufacture of Neat Polymer Blends Neat polymer blends consisting of a PEEK as PAEK-1 and a PEAK-2 in Table 1 were produced by melt compounding on a Coperion® ZSK 26 or a Berstorff co-rotating intermeshing twin-screw extruder. Compounding conditions on each machine utilized barrel temperature set points between 340 and 350° C.

Testing specimens were molded using a temperature profile of 349-354° C. rear, 371-377° C. middle, and 377-390° C. front zones with mold temperatures between 150 and 200° C. for blends of PEEK/PAEK-2.

Results and Discussion

Neat (i.e. without additional ingredients) blends of PEEK and PEEK-PEDEK [blends (B-1b) in the description] having the composition indicated in Table 1a show advantageous performance over neat PEEK (Table 1). Blends of PEEK/PEEK-PEDEK demonstrate high flow, shown by examples E5 and E6, similar to Ketaspire® KT-890 PEEK (comparative example C1). The PEEK/PEEK-PEDEK modulus and strength are similar to those of neat PEEK (comparative example C1) while exhibiting higher ductility by tensile strain at break in comparison to neat PEEK. Additionally, notched impact and dynatup impact performance demonstrated similar or better performance over neat PEEK. The improved performance in Dynatup failure mode, where the number of brittle versus ductile failure modes are noted, is especially improved in example E5 where only 25% PAEK-2 blended into PEEK improves the performance of the blend to 100% ductile failure mode in dynatup testing. Similar performance was observed in compositions (C) comprising blends of PEEK/PEEK-PEDEK and glass fibers as reinforcing fibers with results shown in Table 2. The results show that the use of PEEK-PEDEK as PAEK-2 improves flow, modulus, and strength of over control compositions comprising only PEEK-PEDEK and glass fibers (controls C12-C14). Also, the data shows improved ductility by tensile strain at break for examples E8 through E11 in comparison to a control composition comprising PEEK and glass fibers (comparative example C7) and notched impact over such control composition. The notched Izod performance was improved while tensile strength and tensile modulus exhibited similar performance to PEEK, comparative example C7.

TABLE 1

Neat PEEK/PAEK-2 blends - Components

|  | C1 | E1 | E2 | E3 | E4 | E5 | E6 |
|---|---|---|---|---|---|---|---|
| Component(s) | | | | | | | |
| Ketaspire ® KT-890 NL PEEK | 100 | 75 | 60 | 75 | 60 | 75 | 60 |
| PEEK-PEDEK copolymer 70/30 (synthesis example 3) | — | 25 | 40 | — | — | — | — |
| PEEK-PEDEK copolymer 75/25 (synthesis example 4) | — | — | — | 25 | 40 | — | — |
| PEEK-PEDEK copolymer 80/20 (synthesis example 5) | — | — | — | — | — | 25 | 40 |
| Test | | | | | | | |
| MV, Pa * s, 400 C., 1000/s | 77 | — | — | 89 | 99 | — | — |
| DSC, Tg, 2nd pass, ° C. | 145 | 149 | 150 | 150 | 150 | 147 | 149 |
| DSC, · Hm 2nd Heat, J/g | 68.52 | 61.13 | 54.46 | 59.46 | 54.99 | 64.42 | 58.55 |
| Tensile Modulus, ksi, ASTM D638 | 573 | 553 | 528 | 551 | 529 | 549 | 533 |

TABLE 1-continued

Neat PEEK/PAEK-2 blends - Components

|  | C1 | E1 | E2 | E3 | E4 | E5 | E6 |
|---|---|---|---|---|---|---|---|
| Tensile Strain @ Break, %, ASTM D638 | 13 | 18 | 22 | 18 | 20 | 19 | 21 |
| Tensile Strength @ Yield, psi, ASTM D638 | 15,300 | 14,800 | 14,100 | 14,800 | 14,500 | 14,800 | 14,500 |
| Notched Izod, ft-lb/in, ASTM D256 | 0.97 [0.01] | 1.03 [0.28] | 1.25 [0.03] | 1.13 [0.11] | 1.07 [0.06] | 1.00 [0.06] | 0.94 [0.02] |
| Dynatup, Total Energy, ft-lbf, ASTM D3763 | 42.6 [16.5] | 35.6 [21.4] | 52.2 [15.4] | 34.4 [22.0] | 57.6 [1.1] | 57.2 [2.0] | 61.1 [2.3] |
| % Ductile Breaks | 40 | 40 | 80 | 40 | 100 | 100 | 100 |

Note:
values in brackets are measurement standard deviations

TABLE 2

Compositions comprising PEEK/PAEK blends and glass fibers - Composition and Properties

|  | C7 | E8 | E9 | E10 | E11 | C12 | C13 | C14 |
|---|---|---|---|---|---|---|---|---|
| Components |  |  |  |  |  |  |  |  |
| Ketaspire ® KT-890 NL PEEK | 70 | 42 | 52.5 | 42 | 42 | — | — | — |
| PEEK-PEDEK copolymer 70/30 (synthesis example 3) | — | 28 | — | — | — | 70 | — | — |
| PEEK-PEDEK copolymer 75/25 (synthesis example 4) | — | — | 17.5 | 28 | — | — | 70 | — |
| PEEK-PEDEK copolymer 80/20 (synthesis example 5) | — | — | — | — | 28 | — | — | 70 |
| Owens Corning OCV 910A glass fiber | 30 | 30 | 30 | 30 | 30 | 30 | 30 | 30 |
| PEEK/PAEK-2 ratio | 100/0 | 60/40 | 75/25 | 60/40 | 60/40 | 0/100 | 0/100 | 0/100 |
| Test |  |  |  |  |  |  |  |  |
| MV, Pa * s, 400 C., 1000/s | 183 | 277 | 228 | 248 | 252 | 423 | 341 | 408 |
| Tensile Modulus, ksi, ASTM D638 | 1,750 | 1,590 | 1,650 | 1,650 | 1,540 | 1,390 | 1,410 | 1,400 |
| Tensile Strain @ Break, %, ASTM D638 | 2.6 | 3.0 | 2.9 | 3.0 | 3.3 | 3.7 | 3.8 | 3.9 |
| Tensile Strength, psi, ASTM D638 | 28,100 | 25,200 | 25,900 | 27,000 | 24,400 | 21,100 | 21,600 | 21,000 |
| Notched Izod, ft-lb/in, ASTM D256 | 1.43 [0.03] | 1.86 [0.06] | 1.59 [0.03] | 1.60 [0.10] | 1.59 [0.08] | 3.30 [0.02] | 3.03 [0.07] | 3.30 [0.09] |

Note:
Values in brackets are measurement standard deviations.

Examples C15 and E16

Improved Adhesion on Chemically Nano-Etched Metal Substrates

The following examples illustrate the improved adhesion obtained from overmolding compositions of the invention onto a chemically nano-etched metal surface as described in European patent applications EP 1459882 A1 and EP1559542 A1 assigned to Taiseiplas corporation (so-called nano-molding technology or NMT-treated) when compared to compositions of state of the art.

Blending and Compounding

For Example E16 in Table 3, the two polymeric ingredients of the composition (PAEK-1, PAEK-2) were first tumble blended for 20 minutes in a 5-gallon drum to create a premix of the resins. The premix was next metered to the feed throat of a 25 mm Berstorff co-rotating intermeshing twin-screw extruder having 8 barrel sections. The resin mix was metered at a rate of 17.5 lb/hr using a gravimetric feeder. Fiberglass was fed at barrel section 6, also using a gravimetric feeder, at a rate of 7.5 lb/hr for a total compounding throughput rate of 25 lb/hr. The Barrel section temperature settings during compounding were 330° C. for barrel zone 2 and 340° C. for barrel zones 3-8 and for the adaptor and die. The temperature of the melt was monitored during the compounding run using a handheld temperature probe and was determined to be in the 380-390° C. range. Vacuum venting was provided at barrel section 7 achieving a vacuum level of 25 in Hg to remove moisture and any other volatile residues from the compound. The extrudate of the compounded was stranded from the die and cooled in a water bath and then cut into cylindrical pellets approximately 3.0 mm in length and 2.7 mm in diameter. The composition of comparative example C15 was prepared in a similar manner to that described above for example E 16.

Injection Molding

The pellets obtained from the compounding process above were first dried in a 150° C. desiccated convection air oven for approximately 16 hours (overnight) in preparation for injection molding. Injection molding was performed for two purposes: 1) to produce 3.2 mm (0.125 in) thick ASTM tensile and flexural specimens for mechanical property testing. Type I tensile ASTM specimens and 5 in×0.5 in×0.125 in flexural specimens were injection molded using 30% glass fiber reinforced PEEK injection molding guidelines provided by the supplier (Solvay Specialty Polymers). 2) Injection molding of lap shear over-molded specimens was also carried out on NMT-treated aluminum grade A-6061 coupons that are 4.5 mm long×1.75 mm wide×2 mm thick. These coupons were prepared and supplied by Taiseiplas Corp. A small rectangular specimen of polymer was over-molded onto the aluminum coupons using a three-plate mold manufactured and supplied by Taiseiplas Corp. The rectangular strip of plastic over-molded onto the aluminum coupons was 4.5 cm in length, 1 cm in width and 3 mm in thickness as nominal dimensions. The plastic piece was over-molded onto the aluminum coupons such that there was an overlap area between the two pieces defined by nominal dimensions of 10 mm×5 mm to provide a nominal overlap area of 50 mm². The molding temperatures used for injection molding the overmolded lap shear assemblies were as follows: barrel temperature settings on the 150 ton Toshiba injection molder were: 360/365/371/371° C. for the rear/mid/front/nozzle zones, respectively. The mold temperature was set at 200° C. with actual mold temperature achieved being around 195° C.

Lap Shear Adhesion Testing

The over-molded aluminum/plastic assembly that was obtained from the molding described above was tested for lap shear strength in an Instron® tensile test apparatus following the guidelines of ASTM D1002. A positioning fixture supplied by Taiseiplas was used to hold the assembly in place in the Instron grips and to maintain the alignment of the metal and plastic pieces during the tensile pull on the two materials to assure that the force applied on the lap interface is a purely shear force. A pull rate of 0.05 in/min was used for this testing and the lap shear strength of each specimen was calculated by dividing the load needed to break apart each assembly divided by the nominal overlap area of the joint. The lap shear strength is what we refer to here interchangeably as adhesion strength of the plastic to the metal substrate.

Results and Discussion

As can be seen from the data tabulated in Table 3, the lap shear adhesion strength of the composition of Example E16, comprising 52% wt PEEK and 17.5% wt PEKK [blend (B-1a) in the description] outperformed the the control composition containing PEKK only by a large margin (comparative example C15). In fact the adhesion of the composition prepared according to the instant invention is approximately double that of the state of the control composition. In addition to achieving this greatly improved adhesion toward the treated aluminum, the mechanical properties of the composition according to this invention are for the most part on par with those of the control composition.

TABLE 3

Lap shear adhesion of glass fiber reinforced PEEK and PEEK/PEKK blend compositions onto NMT treated A-6061 aluminum coupons

| Example | C15 | E16 |
|---|---|---|
| Ketaspire ® KT-880P PEEK | 70.0 | 52.5 |
| Cypek ® DS-E PEKK | — | 17.5 |
| OCV-910A Glass Fiber | 30.0 | 30.0 |
| PEEK/PEKK ratio | 100/0 | 75/25 |
| NMT Lap Shear Mean (MPa) | 17.1 | 34.7 |
| NMT Lap Shear Std. Deviation (MPa) | 7.8 | 4.3 |
| Tensile Strength (psi) | 24900 | 27100 |
| Tensile Modulus (Ksi) | 1580 | 1640 |
| Tensile Elongation at Break (%) | 3.1 | 2.7 |
| Flex Strength (psi) | 40800 | 40200 |
| Flex Modulus (Ksi) | 1660 | 1650 |
| Flex Strain at Break (%) | 3.0 | 2.8 |
| Notched Izod (ft-lb/in) | 1.6 | 1.5 |
| Unnotched Izod (ft-lb/in) | 17.8 | 15.3 |
| Melt Visc. at 1000 1/s and 400° C. (kPa-s) | 0.35 | 0.26 |

Examples C17 to E24

Preparation of Glass Fiber-Reinforced Compositions

For Examples E19 to E24 in Table 4, the two polymeric ingredients of the composition (PAEK-1 and PAEK-2) were first tumble blended for 20 minutes in a 5-gallon drum to create a premix of the resins. The premix was next metered to the feed throat of a 25 mm Berstorff co-rotating intermeshing twin-screw extruder having 8 barrel sections. The resin mix was metered at a rate of 12.6 lb/hr using a gravimetric feeder. Fiberglass was fed at barrel section 6, also using a gravimetric feeder, at a rate of 5.4 lb/hr for a total compounding throughput rate of 18 lb/hr. The Barrel section temperature settings during compounding were 330° C. for barrel zone 2 and 340° C. for barrel zones 3-8 and for the adaptor and die. The temperature of the melt was monitored during the compounding run using a handheld temperature probe and was determined to be in the 380-390° C. range. Vacuum venting was provided at barrel section 7 achieving a vacuum level of 25 in Hg to remove moisture and any other volatile residues from the compound. The extrudate of the compounded was stranded from the die and cooled in a water bath and then cut into cylindrical pellets approximately 3.0 mm in length and 2.7 mm in diameter. The composition of Control C15 was prepared in a similar manner to that described above for Examples E19 to E24. The control compositions C17 and C18 were prepared in a similar manner as for C15, except that the temperature setting for the Barrel section temperature settings during compounding were 300° C. for barrel zone 2 and 340° C. for barrel zones 3-8 and for the adaptor and die.

The melting temperature $T_m$ was determined as the peak temperature of the melting endotherm on the 2nd heat scan in DSC at 20° C./minute.

TABLE 4

| Composition | PAEK-2 Polymer Repeat Unit | Source (synthesis example) | PAEK-2 $T_m$ | PEEK wt % | PAEK-2 wt % | GF wt % | PEEK/PAEK-2 wt/wt ratio |
|---|---|---|---|---|---|---|---|
| C15 | None | | | 70.0 | 0 | 30.0 | 100/0 |
| C17 | (J'-A) and (J'-D) | Ex. 3. | 296 | 0 | 70.0 | 30.0 | 0/100 |
| C18 | (J'-A) and (J'-D) | Ex. 5 | 312 | 0 | 70.0 | 30.0 | 0/100 |
| E19 | (J'-P) | Ex. 1 | ND$^a$ | 52.5 | 17.5 | 30.0 | 75/25 |
| E20 | (J'-A) and (J'''-A) | Ex. 2 | ND$^a$ | 65.8 | 4.2 | 30.0 | 94/6 |
| E21 | (J'-A) and (J'-D) | Ex. 3 | 296 | 52.5 | 17.5 | 30.0 | 75/25 |
| E22 | (J'-A) and (J'-D) | Ex. 4 | 304 | 52.5 | 17.5 | 30.0 | 75/25 |
| E23 | (J'-A) and (J'-D) | Ex. 5 | 312 | 52.5 | 17.5 | 30.0 | 75/25 |
| E24 | (J'-B) and (J''-B) | Cypek® DS-E PEKK | ND$^a$ | 52.5 | 17.5 | 30.0 | 75/25 |

$^a$amorphous polymers: no melting endotherm detected on the second heat DSC scan
$^b$the composition of E19 comprises a blend (B-1C), that of E20 a blend (B-1d) those of E21-E23 comprise a blend (B-1b) and that of E24 a blend (B-1a)

Examples C25 to E33

Adhesion of Compositions C15, C17 and C18 and E19 to E14 to Aluminum

These Examples demonstrate the adhesion of PEEK/PAEK-2 overmold compositions to aluminum A-6061 substrates using poly(aryl ether) adhesive compositions. To demonstrate adhesion, lap shear samples were formed and the lap shear stress was measured at room temperature and according to the ASTM D1002 standard with a grip distance of 3.5 inches. Lap shear samples were formed by overmolding the metal substrates with the described PEEK/PAEK-2 compositions. The metal substrates were formed from aluminum 6061 alloy and had a double butt lap joint with a surface area of about 0.25 square inches ("In").

The aluminum substrates were laser etched (Minilase™, from Tykma Technologies) to form a crosshatch pattern having a distance of about 100 μm between parallel lines. Following etching, the metal substrates were rinsed in acetone or isopropanol and dried in a vacuum oven at about 50 Torr to about 100 Torr and at about 50° C. or 100° C.

A PEEK/PAEK-2 composition was deposited on the metal substrates using injection molding (pellets predried at 120° C./25" Hg vacuum for 4 hours). In particular, the metal substrates were preheated to a temperature of about 190° C. to about 200° C. in an oven and, subsequently, on a hotplate. The preheated substrates were then placed in an injection mold heated to about 199° C. The PEEK/PAEK-2 composition was then injected, into the mold, at a temperature between from about 370° C. to about 380° C. to form the lap shear samples. The lap shear sample was removed from the mold and allowed to continue to cool to room temperature.

The lap shear stress values, measured at 0.05 in/minute, listed in TABLE 5 are averaged over the number of lap shear samples in the corresponding Sample Set. The enthalpy of fusion, indicative of the degree of crystallinity of the compositions, derived from the melting endotherm on the 2nd heat scan in DSC at 20° C./minute is also indicated in table 5. The values are expressed relative to the polymer content of the composition, i.e. excluding the filler content. This is obtained by dividing the values measured on the filled compositions by the polymer content (=0.70).

The results of the lap shear test measurements are reported with respect to lap shear stress at break as well and were further analyzed to determine the type of failure at break. In particular, following failure of the lap shear samples, the samples were analyzed to determine if the failure was "Adhesive", "Cohesive", "Partially Cohesive" or "Specimen Break." Adhesive failures were characterized by a lack of visually detectable polymer on the metal and lack of visually detectable metal on the polymer, on the fracture surface of the sample. Cohesive failures were characterized by a visually detectable amount of polymer on the metal or a visually detectable amount of metal on the polymer, on the fracture surface of the sample. Partially Cohesive failures were analogous to Cohesive failures but showed a reduced amount of polymer on the metal or metal on the polymer. "Specimen Break" was characterized by fracture in the bulk polymer and not at the metal/polymer interface.

TABLE 5

| | | lap shear test on aluminum | | | | |
|---|---|---|---|---|---|---|
| Example | PEEK/PAEK-2 composition | Heat of fusion (J/g polymer) of composition | Lap shear Stress (psi) | Std. dev. (psi) | No. Cohesive Failures | Failure Type |
| C25 | C15 | 53.7 | 409 | 120 | 0/5 | adhesive |
| C26 | C17 | 30.0 | 1614 | 165 | 5/5 | 3 partially cohesive + 2 specimen breaks |

TABLE 5-continued lap shear test on aluminum

| Example | PEEK/ PAEK-2 composition | Heat of fusion (J/g polymer) of composition | Lap shear Stress (psi) | Std. dev. (psi) | No. Cohesive Failures | Failure Type |
|---|---|---|---|---|---|---|
| C27 | C18 | 42.7 | 1079 | 324 | 2/5 | 1 partially cohesive + 1 specimen break + 3 adhesive |
| E28 | E19 | 45.4 | 799 | 243 | 0/5 | adhesive |
| E29 | E20 | 54.2 | 635 | 261 | 0/5 | adhesive |
| E30 | E21 | 47.7 | 1316 | 180 | 5/5 | 4 partially cohesive + 1 specimen break |
| E31 | E22 | 49.0 | 1157 | 306 | 3/5 | 3 partially cohesive + 2 adhesive |
| E32 | E23 | 50.6 | 964 | 175 | 3/5 | 3 partially cohesive + 2 adhesive |
| E33 | E24 | 49.1 | 1081 | 253 | 5/5 | 4 partially cohesive + 1 specimen break |

Referring to TABLE 5, the results demonstrate that for the lap shear samples tested, the compositions according to the invention significantly improve the adhesion to aluminum as compared to PEEK (C15), while retaining a good level of crystallinity (>42.8 J/g heat of fusion). The improvement observed with only 25 wt % of PAEK-2 [PAEK-2 to (PAEK-1+PAEK-2) ratio] as in E21 and E23 is surprising based on the lap shear results of C17 and C18, comprising only PAEK-2 and glass fibers [100 wt % PAEK-2 to (PAEK-1+PAEK-2) ratio]. Therefore, these results demonstrate that in the compositions according to the invention there is a unique combination of adhesion and crystallinity (chemical resistance).

Examples C34 to E36

Adhesion of Compositions to Copper

Three of these compositions were evaluated also for adhesion to copper. The conditions of testing were the same as for examples C25 to E33 except that the metal substrates were formed from copper (electrical grade)

The copper substrates were rinsed with acetone, air dried then chemically etched by immersion in an aqueous solution containing 12.2 wt % ferric sulfate pentahydrate and 7.8% sulfuric acid (for 1 minute at 65° C.), rinsing with demineralized water, immersion in an aqueous solution containing 5.5 wt % potassium bichromate and 9.9 wt % sulfuric acid (5 minutes at room temperature) and rinsing with demineralized water. Following etching, the metal substrates were rinsed with demineralized water and dried in a vacuum oven at about 50 Torr to about 100 Torr and at about 120° C.

TABLE 6

| Example | PEEK/ PAEK-2 composition | Heat of fusion (J/g polymer) of composition | Lapshear Stress (psi) | Std. dev. (psi) | No. Cohesive Failures | Failure Type |
|---|---|---|---|---|---|---|
| C34 | C15 | 53.7 | 255 | 90 | 0/5 | adhesive |
| E35 | E19 | 45.4 | 402 | 251 | 0/5 | adhesive |
| E36 | E20 | 54.3 | 393 | 177 | 0/5 | adhesive |

Referring to TABLE 6, the results demonstrate that for the lap shear samples tested, the compositions according to the invention significantly improve the adhesion to copper as compared to a comparative composition containing PEEK only (C34), while retaining a good level of crystallinity (>42.8 J/g heat of fusion).

Examples E37 -E38

Preparation of Glass Fiber-Reinforced Compositions

For the preparation of the compositions of Examples E37, E38 and C39 in Table 7, the ingredients of the compositions were first tumble blended for 20 minutes in a 5-gallon drum to create a premix of the resins. A 40% glass filled PEEK was produced from Ketaspire® 880KT PEEK as a precursor to the final compositions. A Coperion® ZSK 26 co-rotating intermeshing extruder was used to produce the precursor compound. Upstream barrel temperatures were at a set point of 360° C., a transition barrel at 350° C., downstream barrels at 340° C., and the adapter and die at a set point of 350° C. before the melt exited the extruder to be cooled and pelletized. OCV 910A glass fibers were introduced into the polymer melt downstream in the extruder. The measured melt temperature of the extrudate exiting the die was 390° C., acquired by hand-held temperature probe. The final composition was achieved by mixing the 40% glass filled PEEK pellets thus obtained and additional PEEK (KetaSpire® KT-880P) (for the preparation of C39) or polymers powder PAEK-2 prepared according to synthesis examples 6 and 7 (for the preparation on E37 and E38) to reach a final level of 30 wt % glass fibers in the composition. The premix was next metered to the feed throat of a 18 mm Leistritz co-rotating intermeshing twin-screw extruder having 8 barrel sections. The resin mix was metered at a rate of 5 to 6 lb/hr using a gravimetric feeder. For the preparation of C39, the Barrel section temperature settings during compounding were 370° C. for barrel zone 1 and 355° C. for barrel zones 2-5 and for the adaptor and die. The temperature of the melt was monitored during the compounding run using a hand-held temperature probe and was determined to be in the 380-390° C. range. Vacuum venting was provided at barrel section 7 achieving a vacuum level of 8 mm Hg to remove moisture and any other volatile residues from the compound. The extrudate of the compounded was stranded from the die and cooled in a water bath and then cut into cylindrical pellets approximately 3.0 mm in length and 2.7 mm in diameter. The compositions E37 and E38 were prepared in a similar manner as for C39, except that the temperature setting for the Barrel section temperature settings during compounding were 280° C. for barrel zone 1 and 345° C. for barrel zones 2-5 and for the adaptor and die.

The melting temperature $T_m$ was determined as the peak temperature of the melting endotherm on the 2nd heat scan in DSC at 20° C./minute.

TABLE 7

| Composition | PEAK-2 Polymer Repeat Unit | Source (synthesis example) | PAEK-2 $T_m$ (° C.) | PEEK wt % | PAEK-2 wt % | GF wt % | PEEK/PAEK-2 wt/wt ratio |
|---|---|---|---|---|---|---|---|
| E37 | (J''-A) | Ex. 6 | ND[a] | 52.5 | 17.5 | 30 | 75/25 |
| E38 | (J''-Q) | Ex. 7 | 306 | 52.5 | 17.5 | 30 | 75/25 |
| C39 | None | — | | 70 | 0 | 30 | 100/0 |

[a] no melting endotherm detected on the second heat DSC scan

C40 and E41-E42

Adhesion of Compositions C39, E37 and E38 to Aluminum

Adhesion of compositions E37, E38 and C39 to aluminum was evaluated in the same way as in examples C25 to E33; the results of these tests are reported in Table 8 below.

The enthalpy (heat) of fusion, indicative of the degree of crystallinity of the compositions, derived from the melting endotherm on the 2nd heat scan in DSC at 20° C./minute is also indicated in Table 8.

Also in these tests, following failure of the lap shear samples, the samples were analyzed to determine if the failure was "Adhesive", "Cohesive", "Partially Cohesive" or "Specimen Break; the meaning of these expressions is the same as explained above.

TABLE 8

| Example | PEEK/PAEK-2 composition | Heat of fusion (J/g polymer) of composition | Lap shear Stress (psi) | Std. dev. (psi) | No. Cohesive Failures | Failure Type |
|---|---|---|---|---|---|---|
| C40 | C39 | 41.6 | 804 | 107 | 0/5 | Adhesive |
| E41 | E37 | 33.5 | 1157 | 71 | 5/5 | 2 partially cohesive + 3 specimen breaks |
| E42 | E38 | 30.3 | 1202 | 43 | 5/5 | 5 specimen breaks |

Referring to TABLE 8, the results demonstrate that for the lap shear samples tested, the compositions according to the invention significantly improve the adhesion to aluminum as compared to PEEK (C45), while retaining a good level of crystallinity (>30 J/g heat of fusion).

Examples C43 -E45

Preparation of Glass-Fiber Reinforced Compositions

The compositions of comparative Example C43 and Examples E44 and E45, having a 60/40 PEEK (KetaSpire® KT-880)/PAEK-2 ratio, as specified in Table 9 below, were prepared by first tumble blending in powder form the polymers to be blended at the desired ratios for about 20 minutes to create a premix of the polymers. This was followed by melt compounding using a 26 mm Coperion® co-rotating partially intermeshing twin screw extruder having a length to diameter (L/D) ratio of 48:1. The extruder had 12 barrel sections with barrel sections 2 through 7 being heated with a temperature setting of 350° C. while barrel sections 8-12 and the die were heated to a temperature set point of 360° C. The melt temperature recorded for the extrudate as it exited the die ranged between 394 and 398° C. for all the compositions. The feeding of the extruder was such that the polymer components were metered gravimetrically at the extruder feed hopper, while the glass fiber was metered also using a gravimetric feeder at the proportion corresponding to the 30 wt. % level in each composition at barrel section 7. The extruder was operated at a total throughput rate of 40 lb/hr (18.15 kg/hr) which corresponded to a resin feed rate of 28 lb/hr (12.70 kg/hr) and a glass fiber feed rate of 12 lb/hr (5.44 kg/hr). The extruder screw speed was set at 200 rpm throughout and the extruder torque reading was maintained in the 60-70% range during compounding of all the compositions. Vacuum venting with a vacuum level >25 in Hg was applied at barrel section 10 during compounding to strip off moisture and any possible residual volatiles from the compound. The extrudate from each of the runs was stranded and cooled in a water trough and then pelletized into pellets approximately 2.7 mm in diameter and 3.0 mm in length.

linity and $T_m$. To demonstrate adhesion, lap shear samples were formed and the lap shear stress was measured at room temperature and according to the ASTM D1002 standard with a grip distance of 3.5 inches. Lap shear samples were formed by overmolding the metal substrates with the described PAEK1/PAEK2 compositions. The metal substrates were formed from aluminum 6061 alloy and had a double butt lap joint with a surface area of about 0.25 square inches ("In").

The aluminum substrates were laser etched (Minilase™, from Tykma Technologies) to form a crosshatch pattern having a distance of about 100 μm between parallel lines. Following etching, the metal substrates were rinsed in acetone or isopropanol and dried in a vacuum oven at about 50 Torr to about 100 Torr and at about 50° C. or 100° C.

A PAEK1/PAEK2 composition was deposited on the metal substrates using injection molding (pellets pre-dried at 120° C/25" Hg vacuum for 4 hours). In particular, the metal substrates were preheated to a temperature of about 190° C. to about 200° C. in an oven and, subsequently, on a hotplate. The preheated substrates were then placed in an injection mold heated to about 199° C. The PAEK1/PAEK2 composition was then injected, into the mold, at a temperature between from about 370° C. to about 380° C. to form the lap shear samples. The lap shear sample was removed from the mold and allowed to continue to cool to room temperature.

The lap shear stress values, measured at 0.05 in/minute, listed in TABLE 10 are averaged over the number of lap shear samples in the corresponding Sample Set. The heat of fusion, indicative of the degree of crystallinity of the compositions, derived from the melting endotherm on the 2nd heat scan in DSC at 20° C./minute is also indicated in TABLE 10.

The results of the lap shear test measurements are reported with respect to lap shear stress at break as well and were further analyzed to determine the type of failure at break. In particular, following failure of the lap shear samples, the samples were analyzed to determine if the failure was "Adhesive", "Cohesive", "Partially Cohesive" or "Specimen Break." Adhesive failures were characterized by a lack of visually detectable polymer on the metal and lack of visually detectable metal on the polymer, on the fracture surface of the sample. Cohesive failures were characterized

TABLE 9

| Composition | PAEK2 Polymer Repeat Unit | Source | PAEK2 $T_m$ (° C.) | PAEK2 wt % | PAEK 2 wt % | GF wt % | PEEK/PAEK2 wt/wt ratio |
|---|---|---|---|---|---|---|---|
| C43 | (J'-B) and (J"-B), (J'-B)/(J"-B) > 65/35 | Cypek® FC | 336 | 42 | 28 | 30.0 | 60/40 |
| E44 | (J'-B) and (J"-B) (J'-B)/(J"-B) = 55/45-65/35 | Cypek® DS-M | NDa | 42 | 28 | 30.0 | 60/40 |
| E45 | (J'-B) and (J"-B) (J'-B)/(J"-B) = 55/45-65/35 | Cypek® DS-E | 310 | 42 | 28 | 30.0 | 60/40 | a: no melting endotherm detected on the second heat DSC scan

Examples C46 to E48

Adhesion Strength of Compositions C43-E45 to Aluminum

These Examples demonstrate the adhesion of blends of PEEK =PAEK1 with PAEK2 =PEKK of different crystalby a visually detectable amount of polymer on the metal or a visually detectable amount of metal on the polymer, on the fracture surface of the sample. Partially Cohesive failures were analogous to Cohesive failures but showed a reduced amount of polymer on the metal or metal on the polymer. "Specimen Break" was characterized by fracture in the bulk polymer and not at the metal/polymer interface.

TABLE 10

| Example | PEEK/ PAEK2 composition | Heat of fusion (J/g) of composition | Lap shear Stress (psi) | Std. dev. (psi) | No. Cohesive Failures | Failure Type |
|---|---|---|---|---|---|---|
| C46 | C43 | 44.7 | 1190 | 249 | 5/5 | 3 partially cohesive + 2 specimen breaks |
| E47 | E44 | 37.7 | 1330 | 149 | 6/6 | 3 partially cohesive + 3 specimen breaks |
| E48 | E45 | 37.3 | 1330 | 95 | 6/6 | 3 partially cohesive + 3 specimen breaks |

Referring to TABLE 10, the results demonstrate that for the lap shear samples tested, the compositions with PAEK2=PEKK with $T_m$<315° C. (i.e. amorphous PEKK) exhibit better adhesion than compositions with PAEK232 PEKK with $T_m$>315° C. (i.e. crystalline PEKK), while retaining a good level of crystallinity (>30 J/g heat of fusion).

The invention claimed is:

1. A method of coating a metal surface, said method comprising applying to a metal surface a polymer composition comprising a polymer blend [blend (B)] consisting of:
a first polyaryl ether ketone (PAEK-1) and
a second polyaryl ether ketone (PAEK-2),
wherein the (PAEK-1) is crystalline and exhibits a melting temperature Tm of 330° C. or higher and the (PAEK-2) is either amorphous or crystalline and exhibits a melting temperature $T_m$ of 315° C. or lower and wherein the (PAEK-1) constitutes more than 50% wt of blend (B)
and wherein the polymer composition is heated to a temperature higher than the melting temperature of (PAEK-1) before being applied to the metal surface,
wherein the polymer blend (B) is a blend (B-1) comprising:
a (PAEK-1) which is a polyether ether ketone comprising at least 98% moles of recurring units of formula (J'-A):

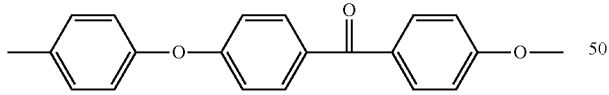

(J'-A)

and
a (PAEK-2) wherein at least 50% moles of the recurring units are a combination of units of formula (J'-A) and (J'-D), units of formula (J'''-A), units of formula (J'-P), or a combination of units of formulas (J'-A) and (J''-A), said units complying with the formulas:

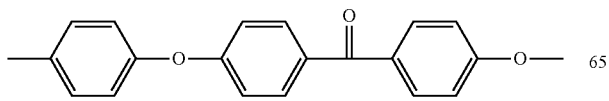

(J'-A)

-continued

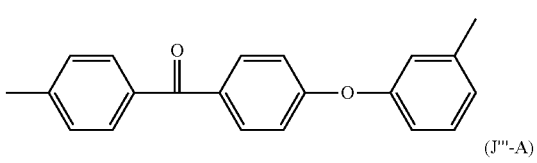

(J''-A)

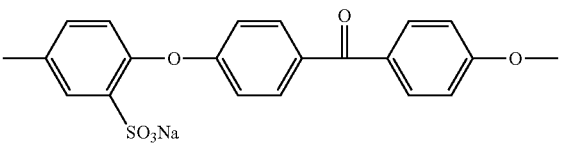

(J'''-A)

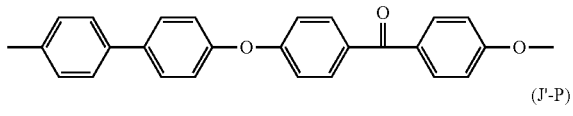

(J'-D)

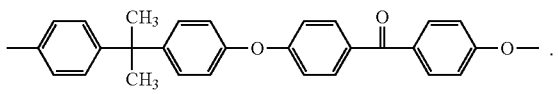

(J'-P)

2. The method according to claim 1, wherein the blend (B-1) is selected from the group consisting of:
2) a blend (B-1), comprising:
a (PAEK-1) wherein all recurring units are units of formula (J'-A) and
a (PAEK-2) wherein all recurring units are a combination of units (J'-A) and (J'-D);
3) a blend (B-1c), comprising:
a (PAEK-1) wherein all recurring units are units of formula (J'-A) and
a (PAEK-2) wherein all the recurring units are recurring units of formula (J'-P);
4) a blend (B-1d), comprising:
a (PAEK-1) wherein all recurring units are units of formula (J'-A) and
a (PAEK-2) in which at least 50% moles of the recurring units are recurring units (P- A);
and
5) a blend (B-1e), comprising:
a (PAEK-1) which is a PEEK wherein at least 98% moles of the recurring units are units of formula (J'-A) and
a (PAEK-2) which is a PAEK in which at least 95% moles of the recurring units are recurring units (J'-A) and (J''-A).

3. A polymer composition comprising a polymer blend [blend (B-1)] selected from the group consisting of the blend (B-1c), the blend (B-1d) and the blend (B-1e) according to claim 2.

4. The method according to claim 1, wherein the polymer composition comprises a reinforcing filler.

5. A method of coating a metal surface, said method comprising applying to a metal surface a polymer composition comprising a polymer blend [blend (B)] consisting of:
   a first polyaryl ether ketone (PAEK-1) and
   a second polyaryl ether ketone (PAEK-2),
wherein the (PAEK-1) is crystalline and exhibits a melting temperature $T_m$ of 330° C. or higher and the (PAEK-2) is either amorphous or crystalline and exhibits a melting temperature $T_m$ of 315° C. or lower and wherein the (PAEK-1) constitutes more than 50% wt. of blend (B),
and wherein the polymer composition is heated to a temperature higher than the melting temperature of (PAEK-1) before being applied to the metal surface,
wherein the blend (B) is a blend (B-2) comprising a (PAEK-2) which is a PAEK wherein at least 50% moles of recurring units comply with formula (J"-A) or (J"-Q):

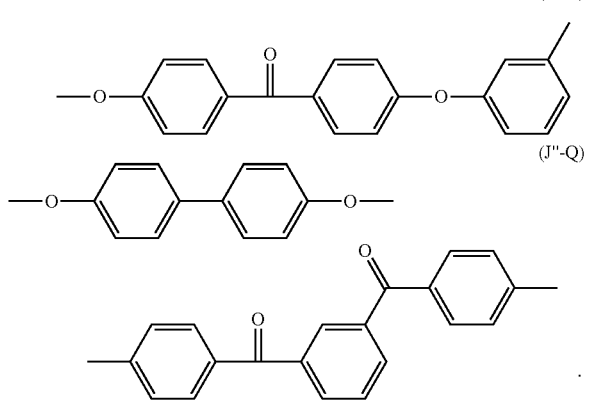

6. The method according to claim 5, wherein the blend (B-2) comprises a (PAEK-1) in which at least 50% moles of the recurring units comply with formula (J'-A), with a combination of formulas (J'-B) and (J"-B) or with formula (J'-C):

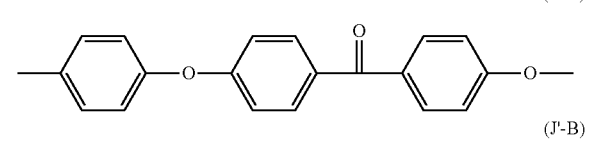

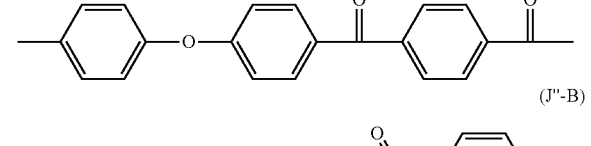

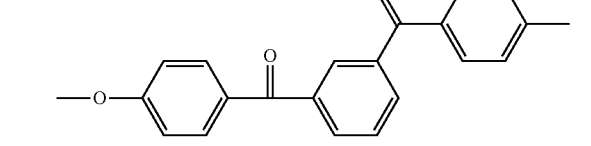

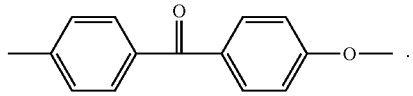

7. The method according to claim 6, wherein the blend (B-2) is selected from the group consisting of:
   1) a blend (B-2a), comprising:
      a (PAEK-1) that is a PEEK wherein at least 98% moles of the recurring units are units of formula (J'-A) and
      a (PAEK-2) that is a PAEK wherein at least 95% moles of the recurring units are recurring units (J"-A);
   and
   2) a blend (B-2b), comprising:
      a (PAEK-1) that is a PEEK wherein at least 98% moles of the recurring units are units of formula (J'-A) and
      a (PAEK-2) that is a PAEK wherein at least 95% moles of the recurring units are recurring units (J"-Q).

8. A polymer composition comprising the polymer blend (B-2a) and (B-2b) according to claim 7.

9. A polymer composition comprising the polymer blend (B-2) according to claim 5.

10. The method according to claim 5, wherein the polymer composition comprises a reinforcing filler.

11. A metal surface coated with a polymer composition comprising a polymer blend [blend (B)] consisting of:
   a first polyaryl ether ketone (PAEK-1) and
   a second polyaryl ether ketone (PAEK-2),
wherein the (PAEK-1) is crystalline and exhibits a melting temperature $T_m$ of 330° C. or higher and the (PAEK-2) is either amorphous or crystalline and exhibits a melting temperature $T_m$ of 315° C. or lower and wherein the (PAEK-1) constitutes more than 50% wt. of blend (B),
wherein the blend (B) is a blend (B-1) comprising:
   a (PAEK-1) which is a polyether ether ketone comprising at least 98% moles of recurring units of formula (J'-A):

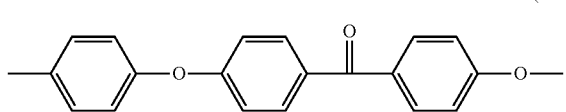

and
   a (PAEK-2) wherein at least 50% moles of the recurring units are a combination of units of formula (J'-A) and (J'-D), units of formula (J'''-A), units of formula (J'-P), or a combination of units of formulas (J'-A) and (J"-A), said units complying with the formulas:

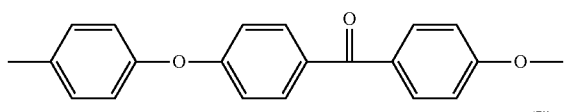

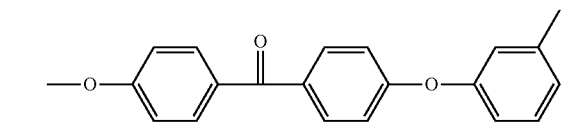

-continued

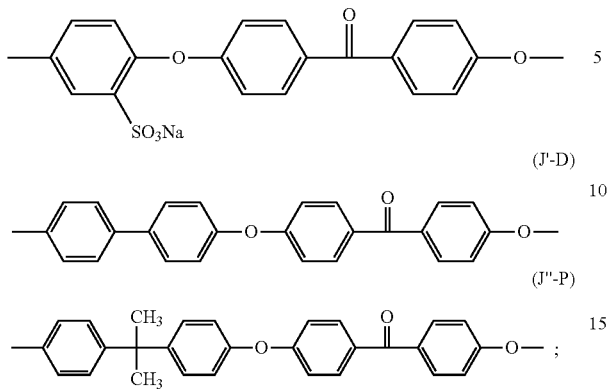

or
wherein the blend (B) is a blend (B-2) comprising a (PAEK-2) which is a PAEK wherein at least 50% moles of recurring units comply with formula (J"-A) or (J"-Q):

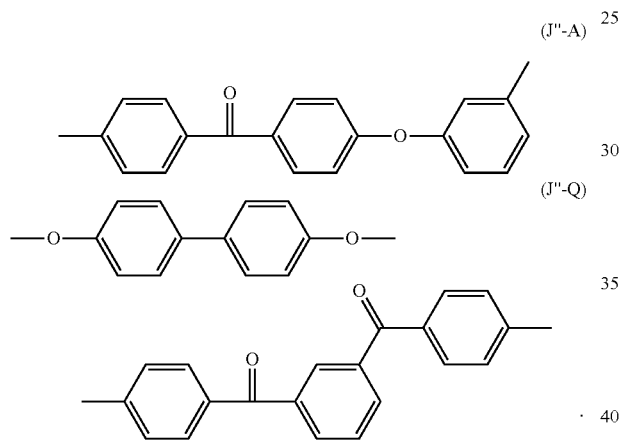

12. The metal surface of claim 11, wherein the surface is of a wire, or the surface is of a structural part of an electronic device.

13. A wire or an electronic device or a part thereof comprising at least one metal surface coated with the polymer composition according to claim 11.

14. The metal surface of claim 11, wherein the blend (B) is the blend (B-2) comprising a (PAEK-1) in which at least 50% moles of the recurring units comply with formula (J'-A), with a combination of formulas (J'-B) and (J"-B) or with formula (J'-C):

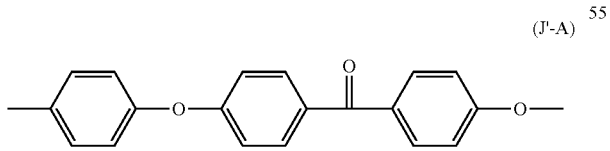

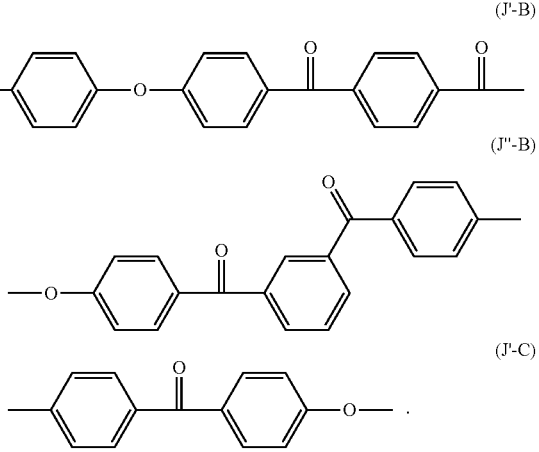

15. The metal surface of claim 14, wherein the blend (B-2) is selected from:
  1) a blend (B-2a), comprising:
    a (PAEK-1) that is a PEEK wherein at least 98% moles of the recurring units are units of formula (J'-A) and
    a (PAEK-2) that is a PAEK wherein at least 95% moles of the recurring units are recurring units (J"-A); and
  2) a blend (B-2b), comprising:
    a (PAEK-1) that is a PEEK wherein at least 98% moles of the recurring units are units of formula (J'-A) and
    a (PAEK-2) that is a PAEK wherein at least 95% moles of the recurring units are recurring units (J"-Q).

16. The metal surface of claim 11, wherein the blend is blend (B-1) selected from the group consisting of:
  2) a blend (B-1b), comprising:
    a (PAEK-1) wherein all recurring units are units of formula (J'-A) and
    a (PAEK-2) wherein all recurring units are a combination of units (J'-A) and (J'-D);
  3) a blend (B-1c), comprising:
    a (PAEK-1) wherein all recurring units are units of formula (J'-A) and
    a (PAEK-2) wherein all the recurring units are recurring units of formula (J'-P);
  4) a blend (B-1d), comprising:
    a (PAEK-1) wherein all recurring units are units of formula (J'-A) and
    a (PAEK-2) in which at least 50% moles of the recurring units are recurring units (J'"-A);
and
  5) a blend (B-1e), comprising:
    a (PAEK-1) which is a PEEK wherein at least 98% moles of the recurring units are units of formula (J'-A) and
    a (PAEK-2) which is a PAEK in which at least 95% moles of the recurring units are recurring units (J'-A) and (J"-A).

* * * * *